(12) United States Patent
Zhang et al.

(10) Patent No.: US 11,627,308 B2
(45) Date of Patent: Apr. 11, 2023

(54) TMVP DERIVATION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/126,707

(22) Filed: Dec. 18, 2020

(65) Prior Publication Data
US 2021/0105482 A1   Apr. 8, 2021

Related U.S. Application Data

(63) Continuation of application No. PCT/IB2019/055546, filed on Jul. 1, 2019.

(30) Foreign Application Priority Data

Jun. 29, 2018  (WO) ................ PCT/CN2018/093656

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/137* (2014.11); *H04N 19/159* (2014.11);
(Continued)

(58) Field of Classification Search
None
See application file for complete search history.

(56) References Cited

U.S. PATENT DOCUMENTS

| | | |
|---|---|---|
| 2002/0114394 A1 | 8/2002 | Ma |
| 2010/0166073 A1 | 7/2010 | Schmit et al. |

(Continued)

FOREIGN PATENT DOCUMENTS

| | | |
|---|---|---|
| AU | 2012305071 A1 | 10/2013 |
| CN | 103096071 A | 5/2013 |

(Continued)

OTHER PUBLICATIONS

Ahn et al. "Modification of Merge Candidate Derivation for Binary Split Cus," Joint Video Exploration Team (JVET) of ITU-T SG 16 WP 3 and ISO/IEC JTC 1/SC 29/WG 11, 8th Meeting, Macao, CN, Oct. 18-25, 2017, document JVET-H0072, 2017.

(Continued)

*Primary Examiner* — Christopher G Findley
(74) *Attorney, Agent, or Firm* — Perkins Coie LLP

(57) ABSTRACT

A video processing method includes deriving multiple temporal motion vector prediction (TMVP) candidates for a video block in a current picture based on multiple blocks associated with a second block in one or more pictures that are temporally co-located with the current picture, wherein the current picture is excluded from the one or more pictures, and the second block is temporally collocated with the video block, wherein the second block has a same size as the video block, and wherein a relative position of the second
(Continued)

block to a top-left corner of a second picture of the one or more pictures is same as that of the video block to a top-left corner of the current picture; adding the multiple TMVP candidates to a motion candidate list associated with the video block; and performing a conversion between the video block and a bitstream.

20 Claims, 41 Drawing Sheets

(51) Int. Cl.
   *H04N 19/176* (2014.01)
   *H04N 19/30* (2014.01)
   *H04N 19/517* (2014.01)
   *H04N 19/137* (2014.01)

(52) U.S. Cl.
   CPC ........... *H04N 19/176* (2014.11); *H04N 19/30* (2014.11); *H04N 19/517* (2014.11)

(56) References Cited

U.S. PATENT DOCUMENTS

| | | | |
|---|---|---|---|
| 2010/0315548 | A1 | 12/2010 | Suen et al. |
| 2012/0224637 | A1* | 9/2012 | Sugio ............... H04N 19/44 375/240.16 |
| 2012/0230411 | A1 | 9/2012 | Liu et al. |
| 2012/0257678 | A1 | 10/2012 | Zhou et al. |
| 2012/0320984 | A1 | 12/2012 | Zhou |
| 2013/0114723 | A1* | 5/2013 | Bici ............... H04N 19/521 375/240.16 |
| 2013/0279595 | A1 | 10/2013 | Lee et al. |
| 2013/0287116 | A1 | 10/2013 | Helle et al. |
| 2014/0086325 | A1 | 3/2014 | Chen et al. |
| 2014/0233654 | A1 | 8/2014 | Sato |
| 2016/0366416 | A1 | 12/2016 | Liu et al. |
| 2017/0214922 | A1 | 7/2017 | Jeon et al. |
| 2019/0297325 | A1* | 9/2019 | Lim ............... H04N 19/51 |
| 2021/0105463 | A1 | 8/2021 | Zhang et al. |

FOREIGN PATENT DOCUMENTS

| | | |
|---|---|---|
| CN | 103583044 A | 2/2014 |
| CN | 103931196 A | 7/2014 |
| CN | 104126302 A | 10/2014 |
| CN | 104202603 A | 12/2014 |
| CN | 104683808 A | 6/2015 |
| CN | 104683809 A | 6/2015 |
| CN | 104904217 A | 9/2015 |
| CN | 105611299 A | 5/2016 |
| CN | 105915901 A | 8/2016 |
| CN | 107027038 A | 8/2017 |
| CN | 107105244 A | 8/2017 |
| CN | 107277547 A | 10/2017 |
| CN | 107295347 A | 10/2017 |
| CN | 107431820 A | 12/2017 |
| CN | 107534767 A | 1/2018 |
| CN | 107566835 A | 1/2018 |
| CN | 107682704 A | 2/2018 |
| CN | 107846596 A | 3/2018 |
| CN | 107888916 A | 4/2018 |
| EP | 2568706 A2 | 3/2013 |
| EP | 2800372 A1 | 11/2014 |
| EP | 3301918 A1 | 4/2018 |
| WO | 2008091206 A1 | 7/2008 |
| WO | 2014089475 A1 | 6/2014 |
| WO | 2016091161 A1 | 6/2016 |
| WO | 2017084512 A1 | 5/2017 |
| WO | 2017197126 A1 | 11/2017 |
| WO | 2018026222 A1 | 2/2018 |
| WO | 2018045944 A1 | 3/2018 |
| WO | 2018099269 A1 | 6/2018 |

OTHER PUBLICATIONS

An et al. "Enhanced Merge Mode Based on JEM7.0," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0059, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Description of SDR, HDR and 360 degree Video Coding Technology Proposal by Qualcomm and Technicolor—Low and High Complexity Versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "Algorithm Description for Versatile Video Coding and Test Model 1 (VTM 1)," Joint Video Experts Team (JVET) of ITU-T SG 16 WP 3 and ISO/IEC JTC 1/SC 29/WG 11, 10th Meeting: San Diego, US, Apr. 10-20, 2018, document JVET-J1002, 2018.

Chien et al. "Sub-Block Motion Derivation for Merge Mode in HEVC," Proceedings of SPIE, Sep. 27, 2016, vol. 9971, pp. 99711K1-99711K7.

Esenlik et al. "Non-CE4: Parallel Merge Estimation for WC," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0216, 2018.

Fu et al. "CE4-Related: Quadtree-based Merge Estimation Region for VVC," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0350, 2019.

Gao et al. "CE4: Parallel Merge Estimation for VVC (CE4.3.2)," Joint Video Experts Team (JVET) of ITU-T SG 16 WP 3 and ISO-IEC JTC 1/SC 29/WG 11, 13th Meeting, Marrakech, MA, Jan. 9-18, 2019, document JVET-M0289, 2019.

H.265/HEVC, https://www.itu.int/rec/T-REC-H.265.

Hsu et al. "Description of SDR Video Coding Technology Proposal by Mediatek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.

Iwamura et al. "Partition-Adaptive Merge Candidate Derivation," Joint Video Experts Team (JVET) of ITU-T SG 16 WP 3 and ISO/IEC JTC 1/SC 29/WG 11, 4th Meeting: Chengdu, CN, Oct. 15-21, 2016, document JVET-D0107, 2016.

JEM-7.0: https://jvet.hhi.fraunhofer.de/svn/svn_HMJEMSoftware/tags/ HM-16.6-JEM-7.0.

Jeon et al. "Parallel Merge Candidate Derivation for Inter_NxN Partition Type," Joint Collaborative Team on Video Coding (JCT-VC) of ITU-T SG16 WP3 and ISO/IEC JTC1/SC29/WG11, 8th Meeting, San Jose, CA, USA, Feb. 1-10, 2012, document JCTVC-H0091, 2012.

Jeon et al. "Non-CE9: Removing PU Dependency in TMVP Reference Index Derivation," Joint Collaborative Team on Video Coding (JCT-VC) of ITU-T SG16 WP3 and ISO/IEC JTC1/SC29/WG11, 8th Meeting, San Jose, CA, USA, Feb. 1-10, 2012, document JCTVC-H0092, 2012.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Sullivan et al. "Overview of the High Efficiency Video Coding (HEVC) Standard," IEEE Transactions on Circuits and Systems for Video Technology, Dec. 2012, 22(12):1649-1668.

Zheng et al. "Simplification and Improvement of Additional Merge Candidate," Joint Collaborative Team on Video Coding (JCT-VC) of ITU-T SG16 WP3 and ISO/IEC JTC1/SC29/WG11, 7th Meeting, Geneva, CH, Nov. 21-30, 2011, document JCTVC-G683, 2011.

(56) References Cited

OTHER PUBLICATIONS

International Search Report and Written Opinion from PCT/IB2019/055541 dated Sep. 3, 2019 (50 pages).
International Search Report and Written Opinion from PCT/IB2019/055542 dated Sep. 3, 2019 (16 pages).
International Search Report and Written Opinion from PCT/IB2019/055545 dated Nov. 21, 2019 (20 pages).
International Search Report and Written Opinion from PCT/IB2019/055546 dated Sep. 20, 2019 (16 pages).
International Search Report and Written Opinion from PCT/IB2019/055558 dated Sep. 3, 2019 (16 pages).
Non-Final Office Action from U.S. Appl. No. 17/126,825 dated Nov. 26, 2021.

\* cited by examiner

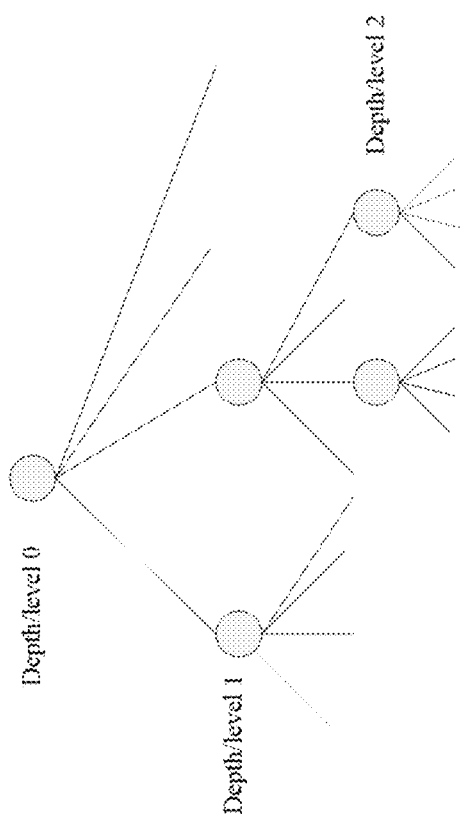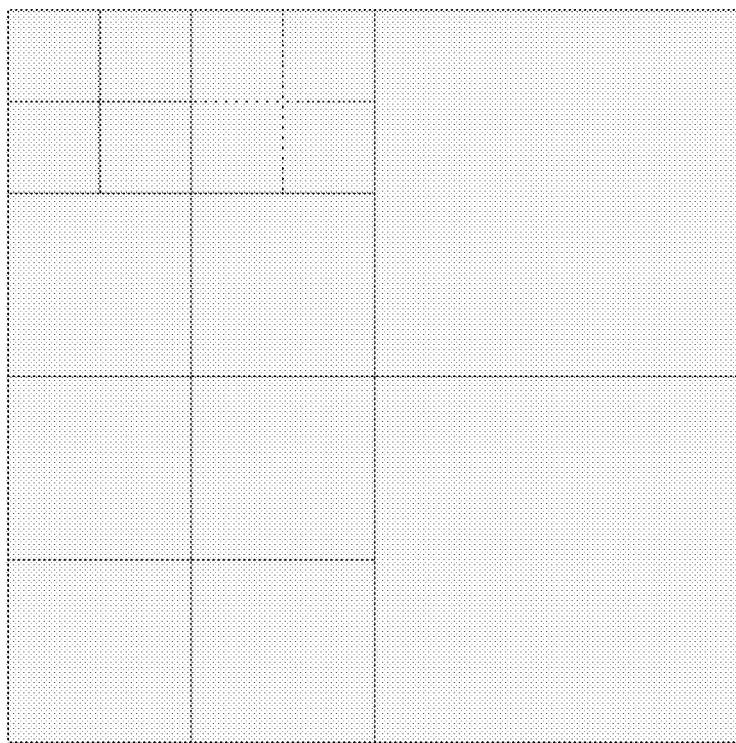
FIG. 4

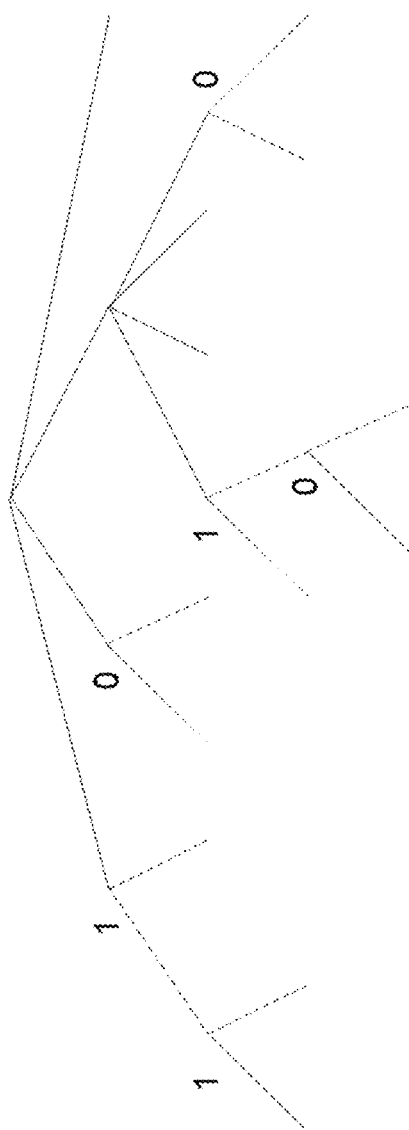
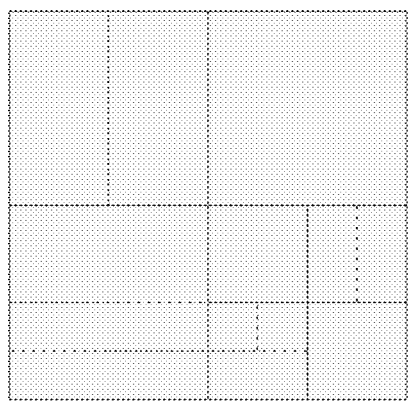
FIG. 5

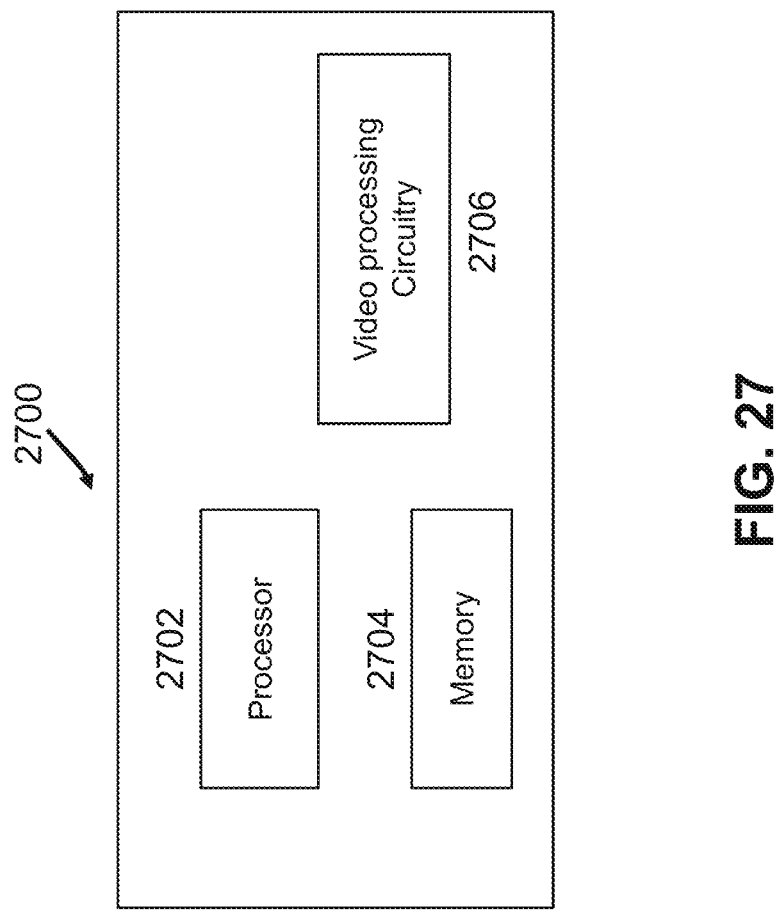

TMVP DERIVATION

CROSS REFERENCE TO RELATED APPLICATIONS

This application is a continuation of International Application No. PCT/IB2019/055546, filed on Jul. 1, 2019, which claims the priority to and benefits of International Patent Application No. PCT/CN2018/093656, filed on Jun. 29, 2018. The entire disclosures of the aforementioned applications are incorporated by reference as part of the disclosure of this application in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This document discloses methods, systems, and devices for encoding and decoding digital video using a merge list of motion vectors.

In one example aspect, a video encoding method includes splitting a block of video data into M sub-blocks according to a partition structure, coding a first subset of the M sub-blocks according to common motion information; and coding a second subset of the M sub-blocks according to motion information that is different than the common motion information for the first subset.

In another example aspect, a video decoding method includes parsing the video bitstream and reconstructing video pictures based on the parsed video bitstream. The video bitstream includes at least a block of video data that is split into M sub-blocks according to a partition structure. M is an integer greater than 1. A first subset of the M sub-blocks is coded according to common motion information and a second subset of the M sub-blocks is coded according to motion information different than the common motion information.

In another example aspect, a video processing method includes deriving a merge candidate list of a child node based on a plurality of neighboring blocks of a parent node of the child node. The parent node represents a unit of video data and is split into multiple child nodes according to a partition structure. The multiple child nodes include the child node and at least another child node adjacent to the child node. The method also includes performing a conversion between the unit of video data and the video bitstream.

In another example aspect, a video processing method includes determining a dimension of a motion estimation region based on a coding characteristic of a video block. The method also includes performing a conversion between the video block and a video bitstream based on the motion estimation region. The motion estimation region represents a portion of a video frame that includes the video block such that a motion vector candidate list is independently derived by checking whether a candidate block is located in the merge estimation region.

In another example aspect, a video processing method includes deriving multiple temporal motion vector prediction (TMVP) candidates for a video block in a current picture based on multiple blocks in one or more pictures that are temporally co-located with the current picture. The current picture is excluded from the one or more pictures. The method also includes adding the multiple TMVP candidates to a motion candidate list associated with the video block and performing a conversion between the video block and a bitstream.

In another example aspect, a video processing method includes generating, for a conversion between a video block in a video picture and a bitstream representation of the video block, a list of merge candidates for the video block. The list of merge candidates includes at least a first merge candidate that is a virtual merge candidate derived by modifying a motion vector and/or a reference picture of a second merge candidate. The method also includes performing, using the list of merge candidates, the conversion between the video block and the video bitstream.

In another example aspect, a video processing includes determining, for a sub-block of a current video block, a sub-block motion candidate based on a first block identified by a motion vector of a spatial merge candidate of the current video block and a relative position between the current video block and a second block wherein the spatial merge candidate is from.

The method also includes performing, using the sub-block motion candidate, a conversion between the current video block and the video bitstream.

In another example aspect, a video decoding method is disclosed. The method includes decoding a video bitstream in which at least one video block is represented using a motion estimation region that is dependent on a coding characteristic of the video block, and reconstructing, from the parsing, a decoded version of the video block, wherein the motion estimation region represents a portion of a video frame that includes the video block such that a motion vector merge candidate lists can be independently derived by checking whether a candidate block is located in that merge estimation region.

In another example aspect, another video decoding method is disclosed. The method includes generating, for a motion compensated video block in a video bitstream, a list of merge candidates, according to a first rule, determining, using a second rule, a current motion information from the list of merge candidates, and reconstructing the video block based on the current motion information.

In yet another aspect, a video decoding method is disclosed. The method includes generating, for a video block in a video bitstream, a list of merge candidates, according to a first rule, extending, using a second rule, the list of merge candidates to an extended list of merge candidates that includes additional merge candidates, and reconstructing the video block using the extended list of merge candidates.

In another example aspect, a method of decoding video bitstream is disclosed. The method includes parsing the video bitstream, and reconstructing video pictures from the parsing. The video bitstream includes at least one block indicated by a parent node that is split into M sub-blocks indicated by child nodes wherein mode information of each sub-block is coded separately and the M sub-blocks are not further split, and M is an integer greater than 1, and wherein not all of the M sub-blocks share same motion information.

In one example aspect, a video encoding method includes deriving multiple temporal motion vector prediction (TMVP) candidates for a video block in a current picture based on multiple blocks associated with a second block in one or more pictures that are temporally co-located with the current picture, wherein the current picture is excluded from the one or more pictures, and the second block is temporally collocated with the video block, wherein the second block has a same size as the video block, and wherein a relative position of the second block to a top-left corner of a second picture of the one or more pictures is same as that of the video block to a top-left corner of the current picture; adding the multiple TMVP candidates to a motion candidate list associated with the video block; and performing a conversion between the video block and a bitstream.

In yet another example aspect, a video decoding apparatus that implements one of the above-described methods is disclosed.

In yet another example aspect, a video encoder device that implements one of the above described method is disclosed.

In yet another representative aspect, the various techniques described herein may be embodied as a computer program product stored on a non-transitory computer readable media.

The computer program product includes program code for carrying out the methods described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 4 illustrates an example implementation for subdivision of a coding tree block (CTB) into CBs and transform block (TBs). Solid lines indicate CB boundaries and dotted lines indicate TB boundaries, including an example CTB with its partitioning, and a corresponding quadtree.

FIG. 5 shows an example of a Quad Tree Binary Tree (QTBT) structure for partitioning video data.

FIG. 27 is a block diagram of an example of a hardware platform for implementing a visual media decoding or a visual media encoding technique described in the present document.

DETAILED DESCRIPTION

To improve compression ratio of avideo, researchers are continually looking for new techniques by which to encode video.

1. Introduction

This patent document describes techniques related to video coding technologies. Specifically, it describes techniques related to merge mode in video coding. The disclosed techniques can be applied to the existing video coding standard like High Efficiency Video Coding (HEVC), or the standard Versatile Video Coding (VVC) to be finalized. It may be also applicable to future video coding standards or video codec.

Brief Discussion

Figure 1:
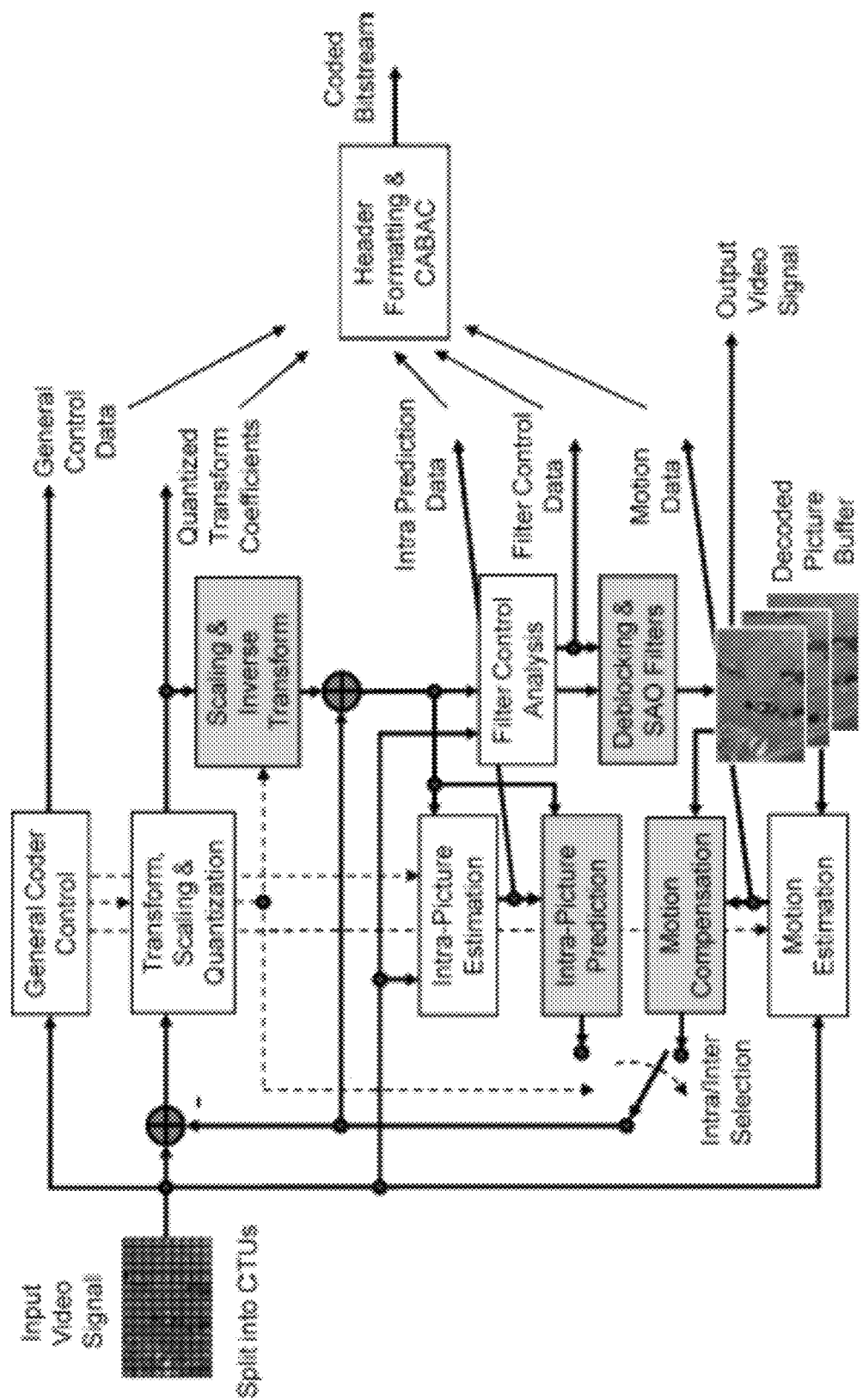
FIG. 1 is a block diagram showing an example of a video encoder implementation

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Structure
2.1.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
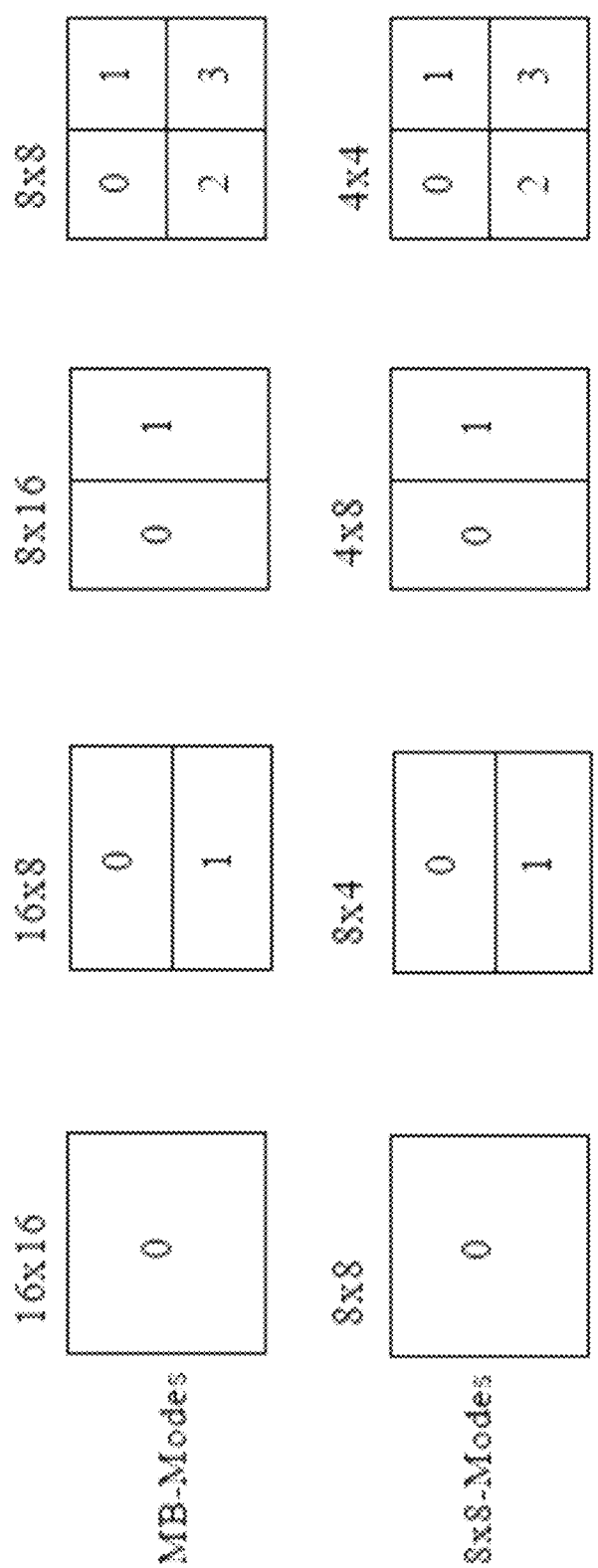
FIG. 2 illustrates macroblock partitioning in the H.264 video coding standard.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

The various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
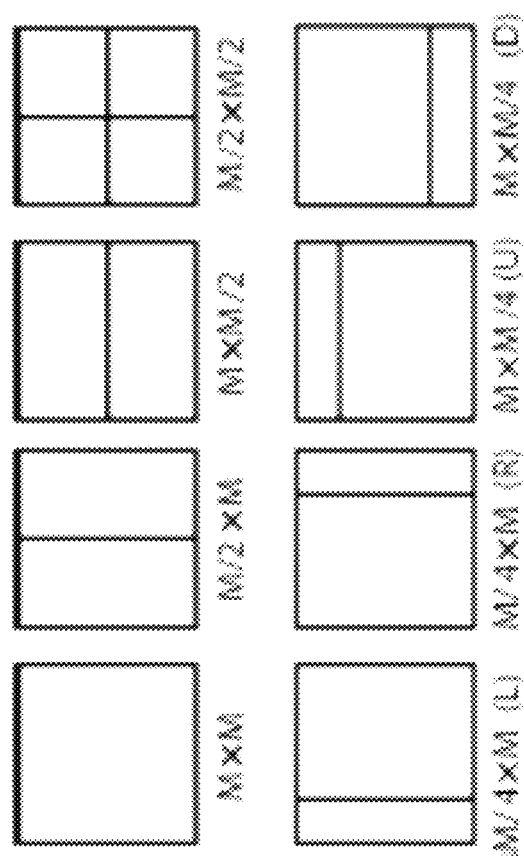
FIG. 3 illustrates an example of splitting coding blocks (CB) into prediction blocks (PBs).

3) Prediction units (PUs) and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for a M×M CU.

4) Transform Units (TUs) and transform blocks (TBs): The prediction residual is coded using block transforms. A TU tree structure has its root at the CU level. The luma CB residual may be identical to the luma TB or may be further split into smaller luma TB s. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIG. 4 shows an example of a subdivision of a CTB into CBs [and transform block (TBs)]. Solid lines indicate CB borders and dotted lines indicate TB borders. (a) CTB with its partitioning. (b) corresponding quadtree.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the Sequence Parameter Set (SPS), each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (e.g., the leaf nodes are not further split). The non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.1.3 Quadtree Plus Binary Tree Block Structure with Larger CTUs in Joint Exploration Model (JEM)

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.1.3.1 QTBT Block Partitioning Structure

Different from HEVC, the QTBT structure removes the concepts of multiple partition types. For example, the QTBT structure removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types—symmetric horizontal splitting and symmetric vertical splitting—in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of predictive (P) and Bi-predictive (B) slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimally allowed quadtree leaf node size

MaxBTSize: the maximally allowed binary tree root node size

MaxBTDepth: the maximally allowed binary tree depth

MinBTSize: the minimally allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (e.g., the MinQTSize) to 128×128 (e.g., the CTU size). If the leaf quadtree node is 128×128, it will not be further split by the binary tree since the size exceeds the MaxBTSize (e.g., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

The left part of FIG. 5 illustrates an example of block partitioning by using QTBT, and the right part of FIG. 5 illustrates the corresponding tree representation. The solid lines indicate quadtree splitting and dotted lines indicate binary tree splitting. In each splitting (e.g., non-leaf) node of the binary tree, one flag is signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for Intra-coded (I) slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4x4 blocks. In the QTBT of the JEM, these restrictions are removed.

2.1.4 Ternary-Tree for Versatile Video Coding (VVC)

Figure 6:
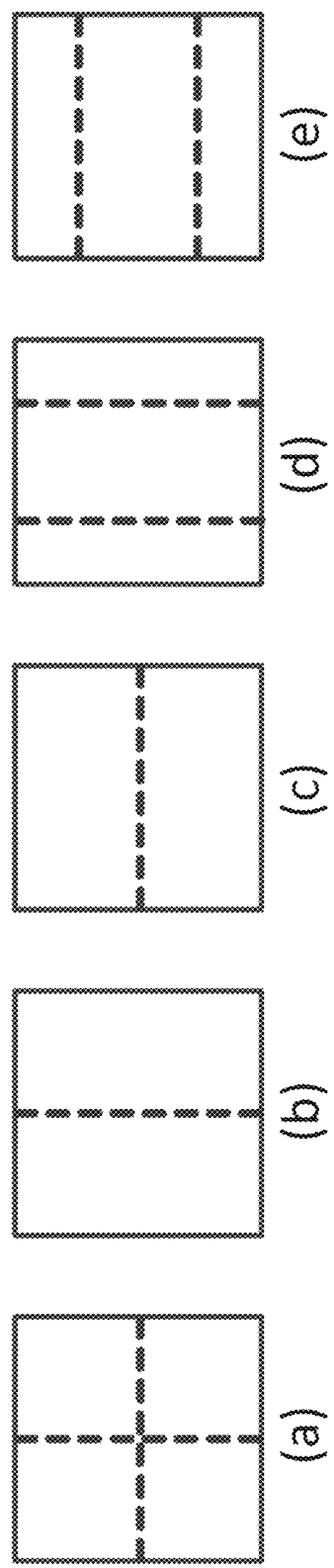
FIG. 6 shows an example of video block partitioning.

FIG. 6 illustrates examples of: (a) a quad-tree partitioning, (b) a vertical binary-tree partitioning (c) a horizontal binary-tree partitioning (d) a vertical center-side ternary-tree partitioning, and (e) a horizontal center-side ternary-tree partitioning. Tree types other than quad-tree and binary-tree have been proposed. In some implementations, two more ternary tree (TT) partitions, e.g., horizontal and vertical center-side ternary-trees are introduced, as shown in FIG. 6 (d) and (e).

In some implementations, there are two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.1.5 Example Partitioning Structure

The tree structure referred to as Multi-Tree Type (MTT) is a generalization of the QTBT. In QTBT, as shown in FIG. 5, a Coding Tree Unit (CTU) is firstly partitioned by a quad-tree structure. The quad-tree leaf nodes are further partitioned by a binary-tree structure.

The fundamental structure of MTT constitutes of two types of tree nodes: Region Tree (RT) and Prediction Tree (PT), supporting nine types of partitions, as shown in FIG. 7.

Figure 7:
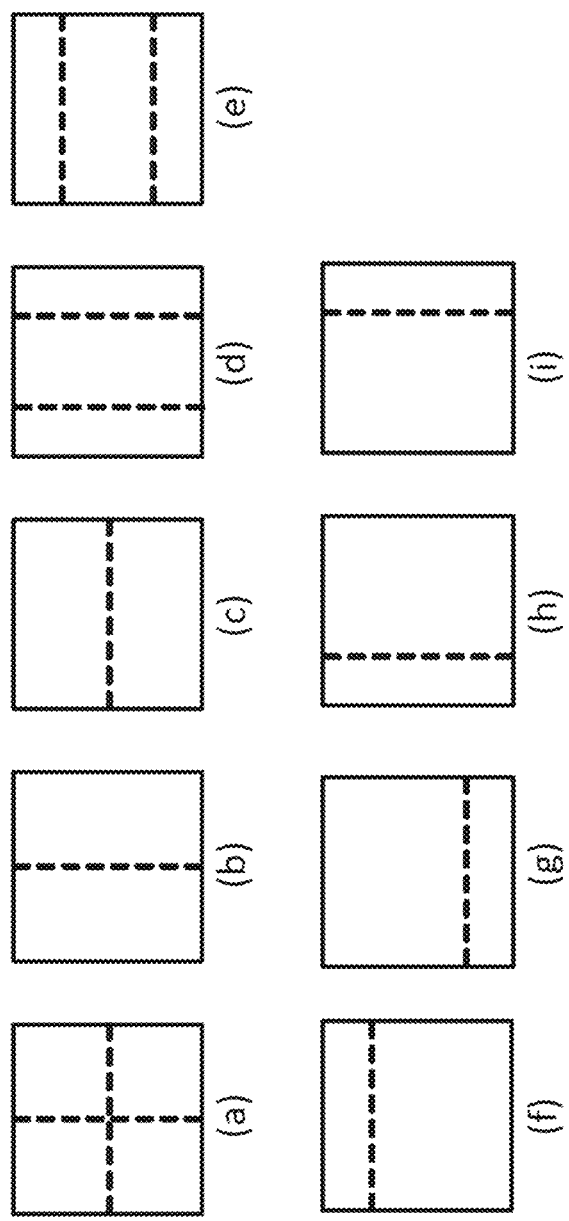
FIG. 7 shows an example of quad-tree partitioning.

FIG. 7 illustrates examples of (a) a quad-tree partitioning, (b) a vertical binary-tree partitioning, (c) a horizontal binary-tree partitioning, (d) a vertical ternary-tree partitioning, (e)

a horizontal ternary-tree partitioning, (f) a horizontal-up asymmetric binary-tree partitioning, (g) a horizontal-down asymmetric binary-tree partitioning, (h) a vertical-left asymmetric binary-tree partitioning, and (i) a vertical-right asymmetric binary-tree partitioning.

Figure 8:
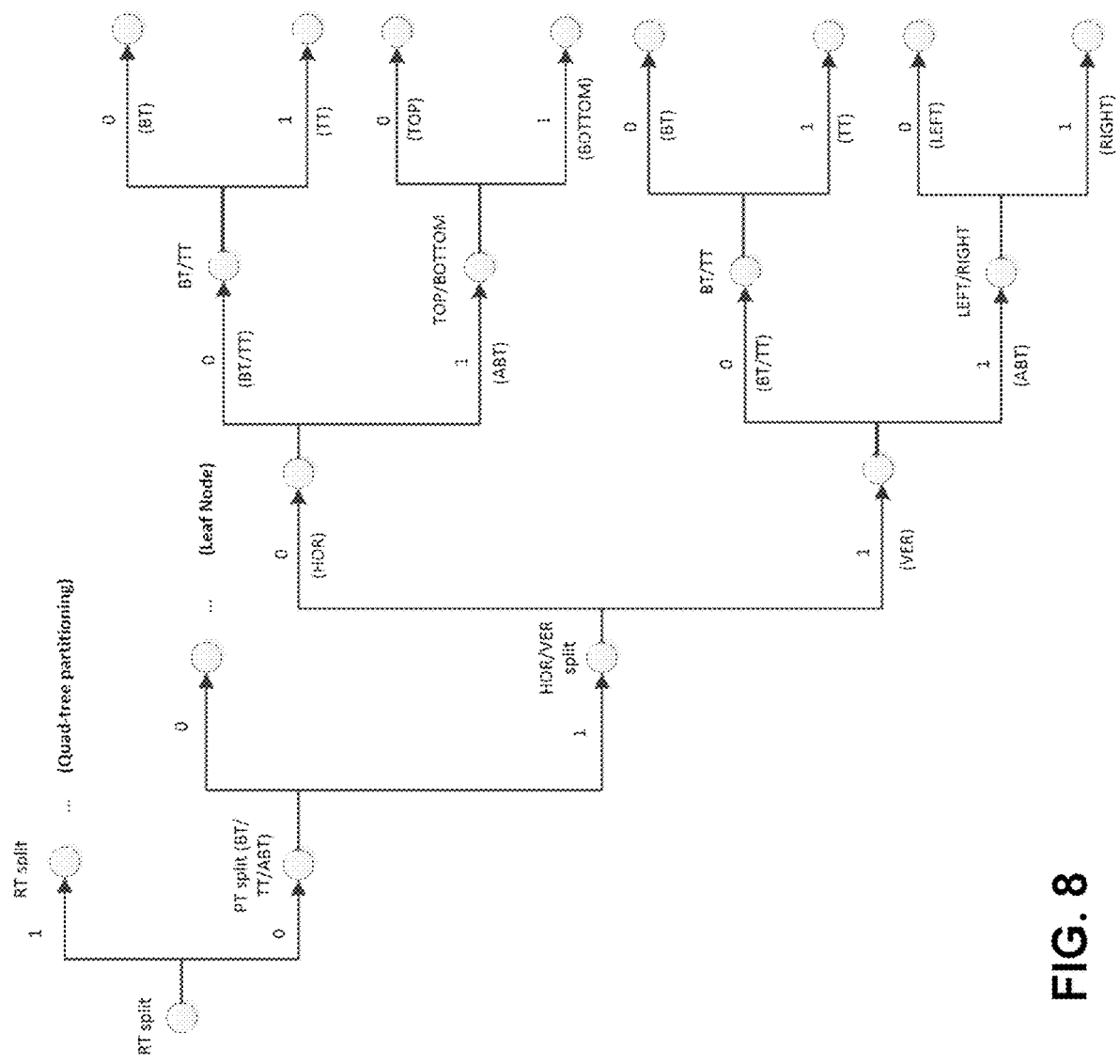
FIG. 8 shows an example of tree-type signaling.

A region tree can recursively split a CTU into square blocks down to a 4×4 size region tree leaf node. At each node in a region tree, a prediction tree can be formed from one of three tree types: Binary Tree (BT), Ternary Tree (TT), and/or Asymmetric Binary Tree (ABT). In a PT split, it may be prohibited to have a quadtree partition in branches of the prediction tree. As in JEM, the luma tree and the chroma tree are separated in I slices. The signaling methods for RT and PT are illustrated in FIG. 8.

2.2 Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors, such a coding mode is called Advanced Motion Vector Prediction (AMVP) mode.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for the skip mode. The alternative to the merge mode is the explicit transmission of motion parameters, where motion vector, corresponding reference picture index for each reference picture list, and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Details on the inter prediction modes are described as follows. The description will begin with the merge mode.

2.2.1 Merge Mode 2.2.1.1 Derivation of Candidates for Merge Mode

Figure 9:
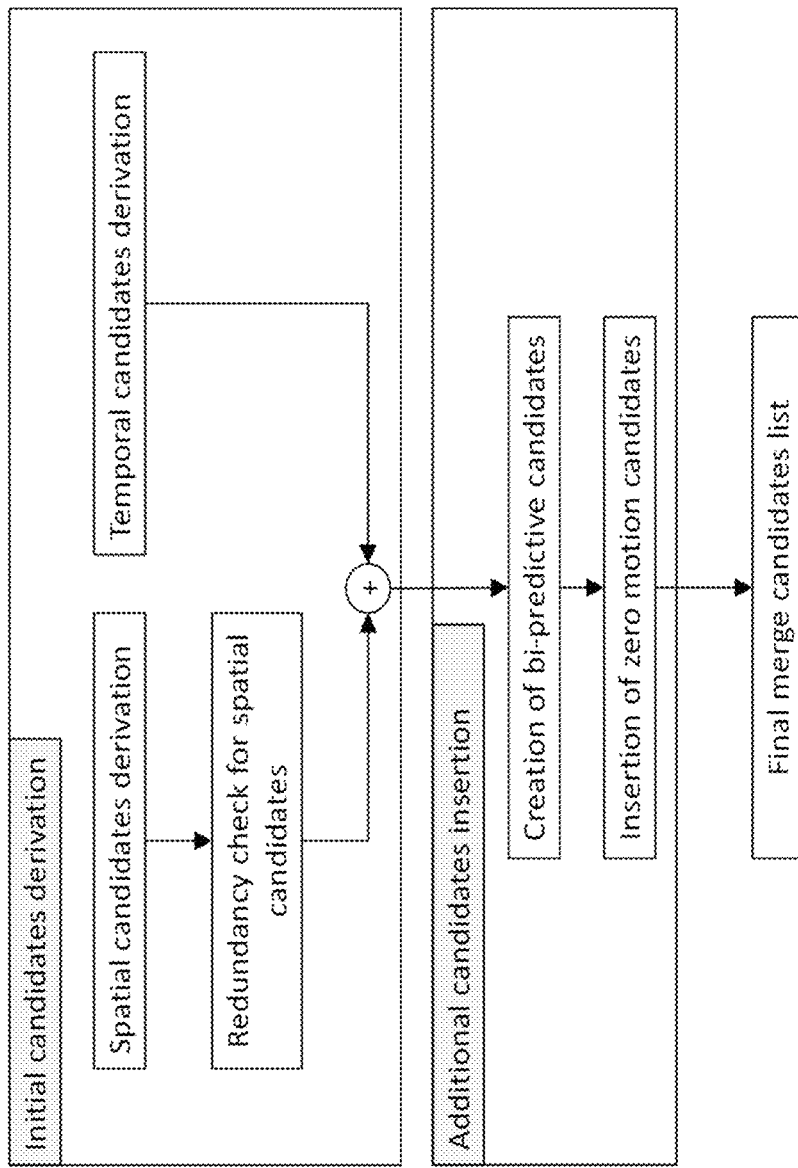
FIG. 9 shows an example of a derivation process for merge candidate list construction.

When a PU is predicted using the merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 9. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (e.g., MaxNumMergeCand) which is signaled in slice header. Since the number of candidates is constant, index of best merge candidate is encoded using truncated unary binarization. If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2 Spatial candidates derivation

Figure 10:
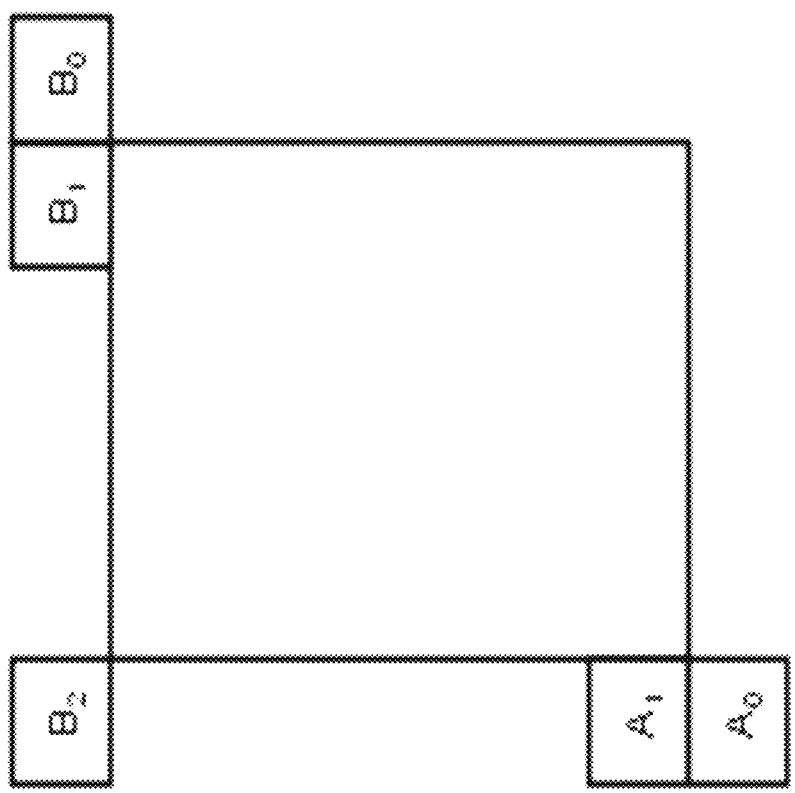
FIG. 10 shows example positions of spatial merge candidates.
Figure 11:
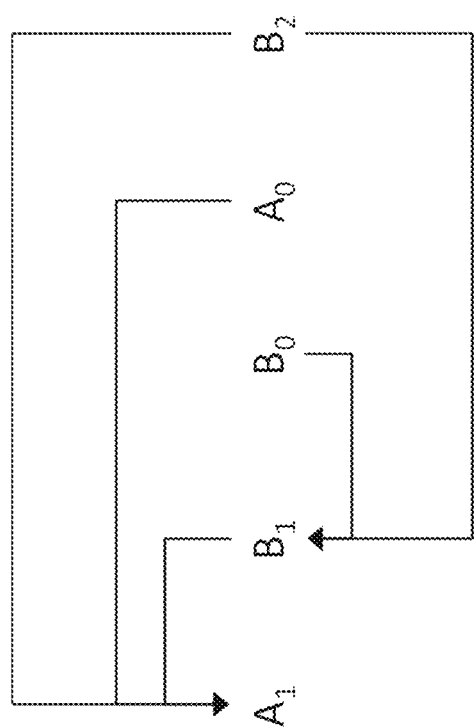
FIG. 11 shows examples of candidate pairs considered for redundancy check of spatial merge candidates.
Figure 12:
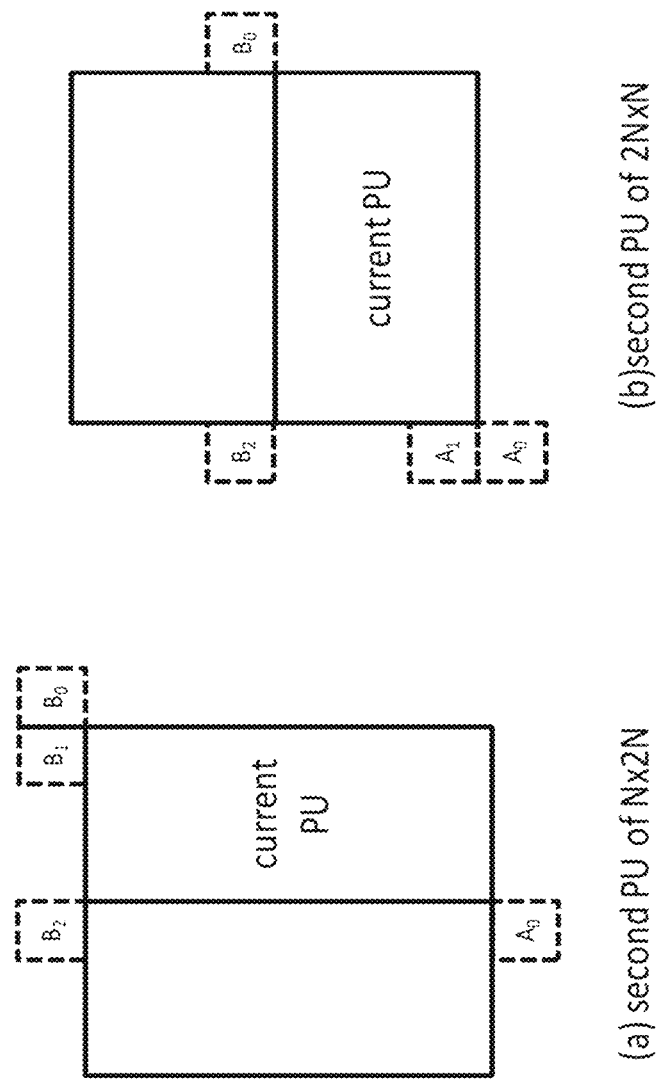
FIG. 12 shows examples of positions for the second PU of N×2N and 2N×N partitions.

In the derivation of spatial merge candidates, a maximum of four merge candidates are selected among candidates located in the positions depicted in FIG. 10. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIG. 12 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3 Temporal Candidate Derivation

Figure 13:
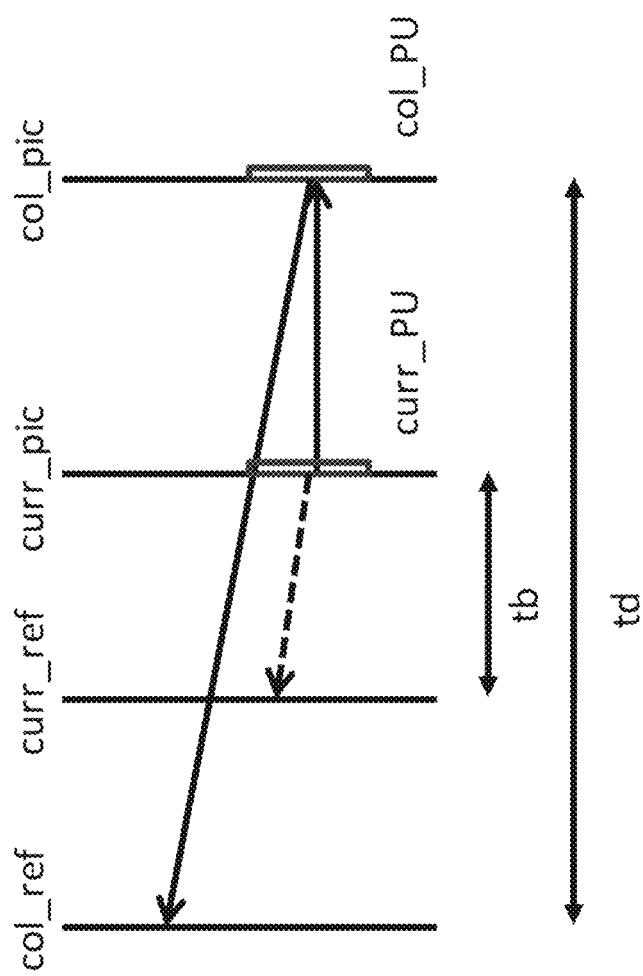
FIG. 13 illustrates example motion vector scaling for temporal merge candidates.

In this step, only one candidate is added to the list. Particularly, in the derivation of this temporal merge candidate, a scaled motion vector is derived based on co-located PU belonging to the picture which has the smallest Picture Order Count (POC) difference with current picture within the given reference picture list. The reference picture list to be used for derivation of the co-located PU is explicitly signaled in the slice header. The scaled motion vector for temporal merge candidate is obtained as illustrated by the dashed line in FIG. 13, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 14:
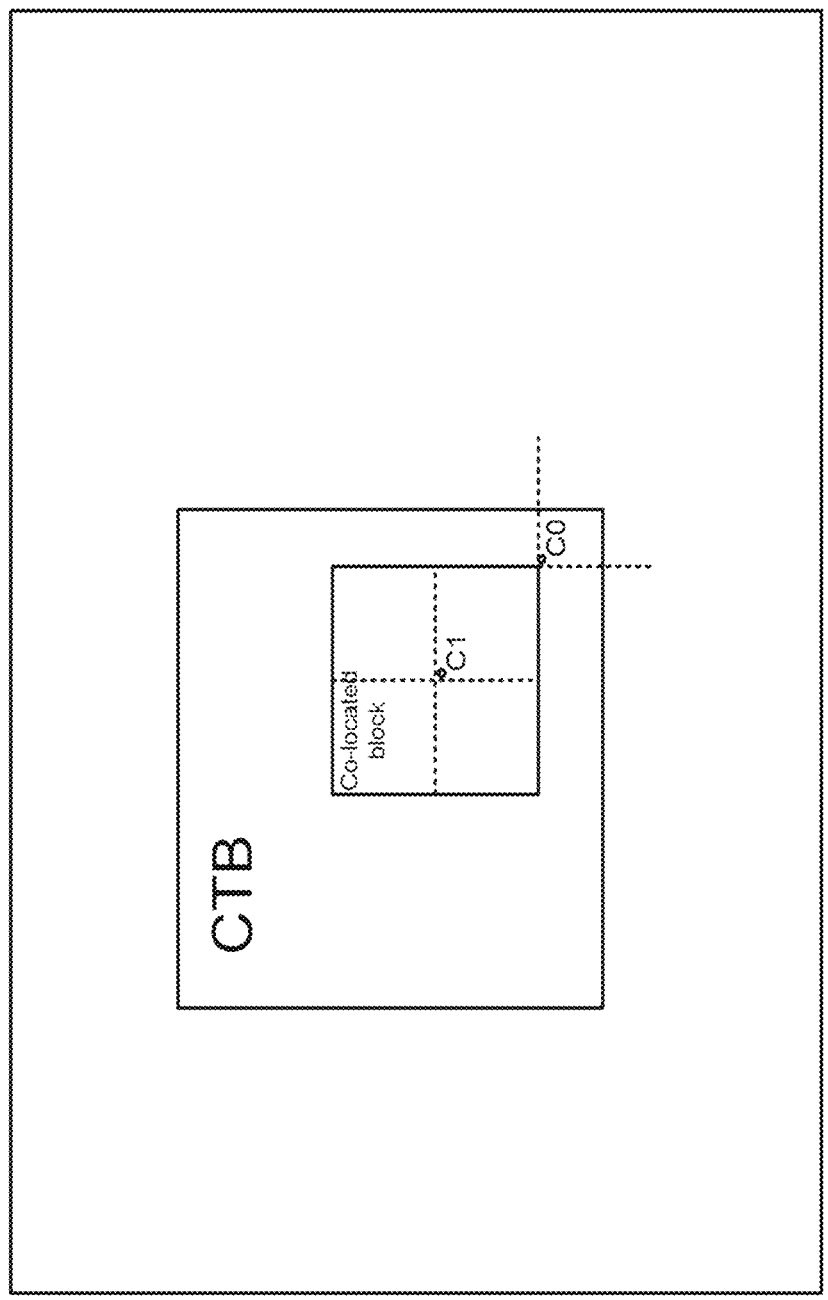
FIG. 14 shows candidate positions for temporal merge candidates, and their co-located picture.

In the co-located PU (Y) belonging to the reference frame, the position for the temporal candidate is selected between candidates Co and C1, as depicted in FIG. 14. If PU at position $C_0$ is not available, is intra coded, or is outside of the current CTU, position $C_1$ is used. Otherwise, position $C_0$ is used in the derivation of the temporal merge candidate.

2.2.1.4 Additional Candidates Insertion

Figure 15:
FIG. 15 shows an example of a combined bi-predictive merge candidate.

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 15 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signaled in the picture parameter set using the "log 2_parallel_merge_level_minus2" syntax element as shown below. When a MER is defined, merge candidates falling in the same region are marked as unavailable and therefore not considered in the list construction.

7.3.2.3 Picture Parameter Set Raw Byte Sequence Payload (RBSP) Syntax 7.3.2.3.1 General Picture Parameter Set RBSP Syntax

|  | Descriptor |
| --- | --- |
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   ... |  |
|   pps_scaling_list_data_present_flag | u(1) |
|   if( pps_scaling_list_data_present_flag) |  |
|     scaling_list_data( ) |  |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   ... |  |
|   rbsp_trailing_bits( ) |  |
| } |  | log 2_parallel_merge_level_minus2 plus 2 specifies the value of the variable Log 2ParMrgLevel, which is used in the derivation process for luma motion vectors for merge mode as specified in clause 8.5.3.2.2 and the derivation process for spatial merging candidates as specified in clause 8.5.3.2.3. The value of log 2_parallel_merge_level_minus2 shall be in the range of 0 to CtbLog 2SizeY-2, inclusive.

The variable Log 2ParMrgLevel is derived as follows:

Log 2ParMrgLevel=log 2_parallel_merge_level_minus2+2

NOTE 3—The value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

2.2.2 Motion Vector Prediction in AMVP Mode

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIGS. 2-8). In the following sections, details about derivation process of motion vector prediction candidate are provided.

2.2.2.1 Derivation of Motion Vector Prediction Candidates

Figure 16:
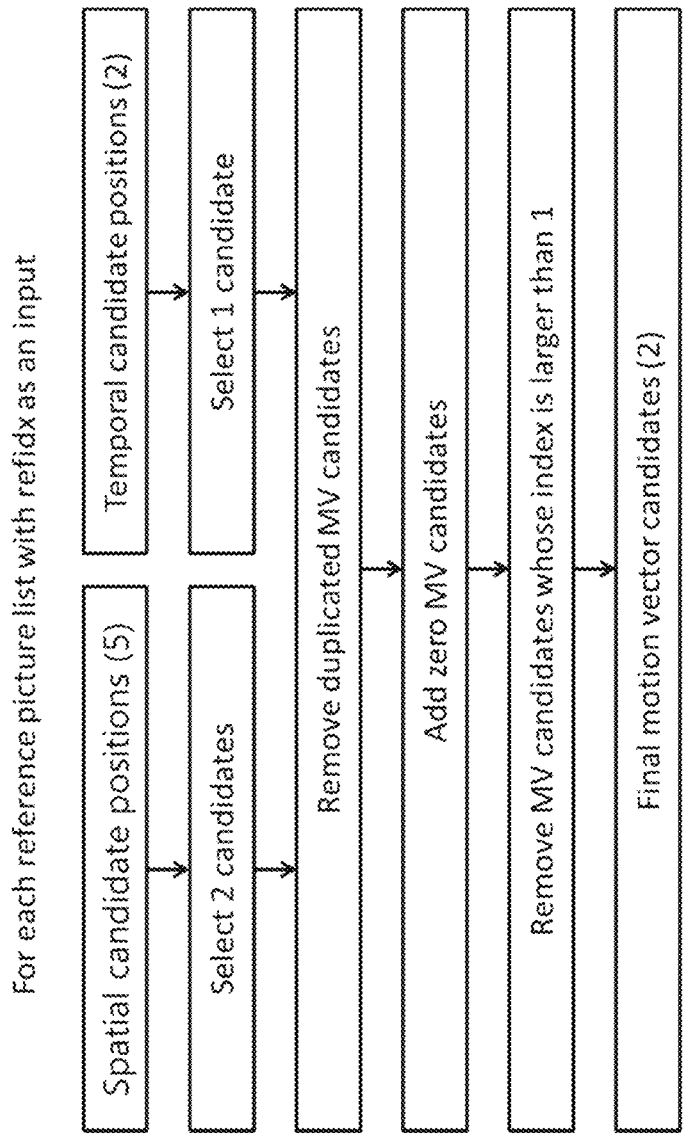
FIG. 16 shows an example of a derivation process for motion vector prediction candidates.

FIG. 16 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 11.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2 Spatial Motion Vector Candidates

In the derivation of spatial motion vector candidates, a maximum of two candidates are considered among five potential candidates, which are derived from PUs located in positions as depicted in FIG. 11, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No Spatial Scaling
(1) Same reference picture list, and same reference picture index (same POC)
(2) Different reference picture list, but same reference picture (same POC)

Spatial Scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
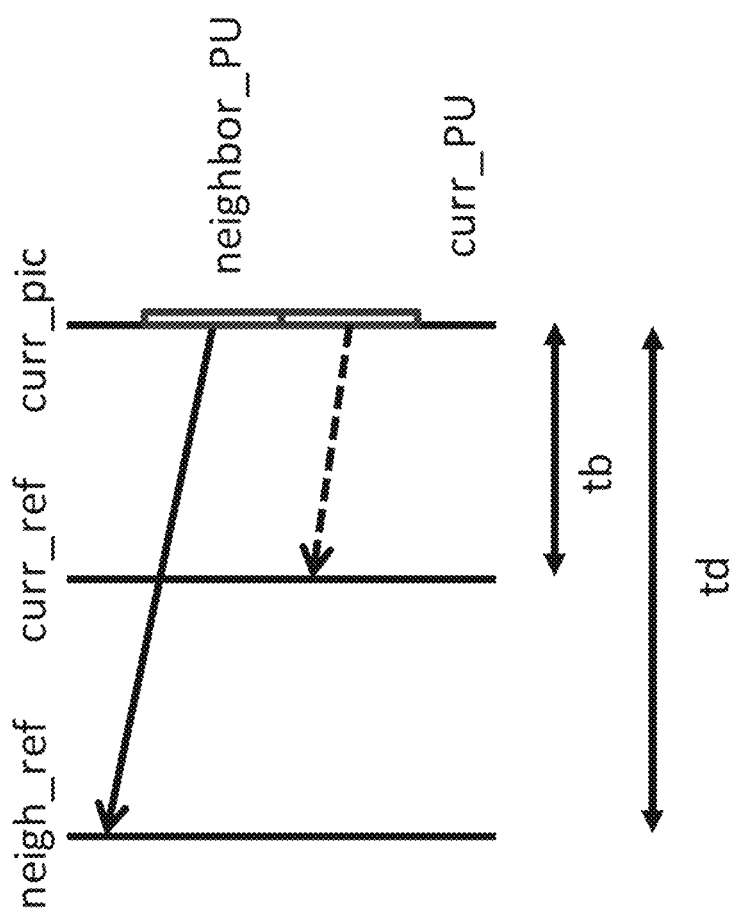
FIG. 17 shows an example of motion vector scaling for spatial motion vector candidates.

In a spatial scaling process, the motion vector of the neighboring PU is scaled in a similar manner as for temporal scaling, as depicted as FIG. 17. The main difference is that the reference picture list and index of current PU is given as input; the actual scaling process is the same as that of temporal scaling.

2.2.2.3 Temporal Motion Vector Candidates

Apart for the reference picture index derivation, all processes for the derivation of temporal merge candidates are the same as for the derivation of spatial motion vector candidates (see FIGS. 2-6). The reference picture index is signaled to the decoder.

2.2.2.4 Signalling of AMVP Information

For the AMVP mode, four parts may be signalled in the bitstream, including prediction direction, reference index, MVD, and my predictor candidate index.

Syntax Tables:

7.3.8.9 Motion Vector Difference Syntax

|  | Descriptor |
|---|---|
| mvd_coding( x0, y0, refList) { |  |
|   abs_mvd_greater0_flag[ 0 ] | ae(v) |
|   abs_mvd_greater0_flag[ 1 ] | ae(v) |
|   if( abs_mvd_greater0_flag[ 0 ] ) |  |
|     abs_mvd_greater1_flag[ 0 ] | ae(v) |
|   if( abs_mvd_greater0_flag[ 1 ] ) |  |
|     abs_mvd_greater1_flag[ 1 ] | ae(v) |
|   if( abs_mvd_greater0_flag[ 0 ] ) { |  |
|     if( abs_mvd_greater1_flag[ 0 ] ) |  |
|       abs_mvd_minus2[ 0 ] | ae(v) |
|     mvd_sign_flag[ 0 ] | ae(v) |
|   } |  |
|   if( abs_mvd_greater0_flag[ 1 ] ) { |  |
|     if( abs_mvd_greater1_flag[ 1 ] ) |  |
|       abs_mvd_minus2[ 1 ] | ae(v) |
|     mvd_sign_flag[ 1 ] | ae(v) |
|   } |  |
| } |  |

2.3 New Inter Prediction Methods in Joint Exploration Model (JEM)

2.3.1 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

|  | Descriptor |
|---|---|
| prediction_unit( x0, y0, nPbW, nPbH ) { |  |
|   if( cu_skip_flag[ x0 ][ y0 ] ) { |  |
|     if( MaxNumMergeCand > 1 ) |  |
|       merge_idx[ x0 ][ y0 ] | ae(v) |
|   } else { /* MODE_INTER */ |  |
|     merge_flag[ x0 ][ y0 ] | ae(v) |
|     if( merge_flag[ x0 ][ y0 ] ) { |  |
|       if( MaxNumMergeCand > 1 ) |  |
|         merge_idx[ x0 ][ y0 ] | ae(v) |
|     } else { |  |
|       if( slice_type == B ) |  |
|         inter_pred_idc[ x0 ][ y0 ] | ae(v) |
|       if( inter_pred_idc[ x0 ][ y0 ] != PRED_L1 ) { |  |
|         if( num_ref_idx_l0_active_minus1 > 0 ) |  |
|           ref_idx_l0[ x0 ][ y0 ] | ae(v) |
|         mvd_coding( x0, y0, 0 ) |  |
|         mvp_l0_flag[ x0 ][ y0 ] | ae(v) |
|       } |  |
|       if( inter_pred_idc[ x0 ][ y0 ] != PRED_L0 ) { |  |
|         if( num_ref_idx_l1_active_minus1 > 0 ) |  |
|           ref_idx_l1[ x0 ][ y0 ] | ae(v) |
|         if( mvd_l1_zero_flag && inter_pred_idc[ x0 ][ y0 ] == PRED_BI) { |  |
|           MvdL1[ x0 ][ y0 ][ 0 ] = 0 |  |
|           MvdL1[ x0 ][ y0 ][ 1 ] = 0 |  |
|         } else |  |
|           mvd_coding( x0, y0, 1 ) |  |
|         mvp_l1_flag[ x0 ][ y0 ] | ae(v) |
|       } |  |
|     } |  |
|   } |  |
| } |  |

To preserve more accurate motion field for sub-CU motion prediction, the motion compression for the reference frames is currently disabled.

2.3.1.1 Alternative Temporal Motion Vector Prediction

Figure 18:
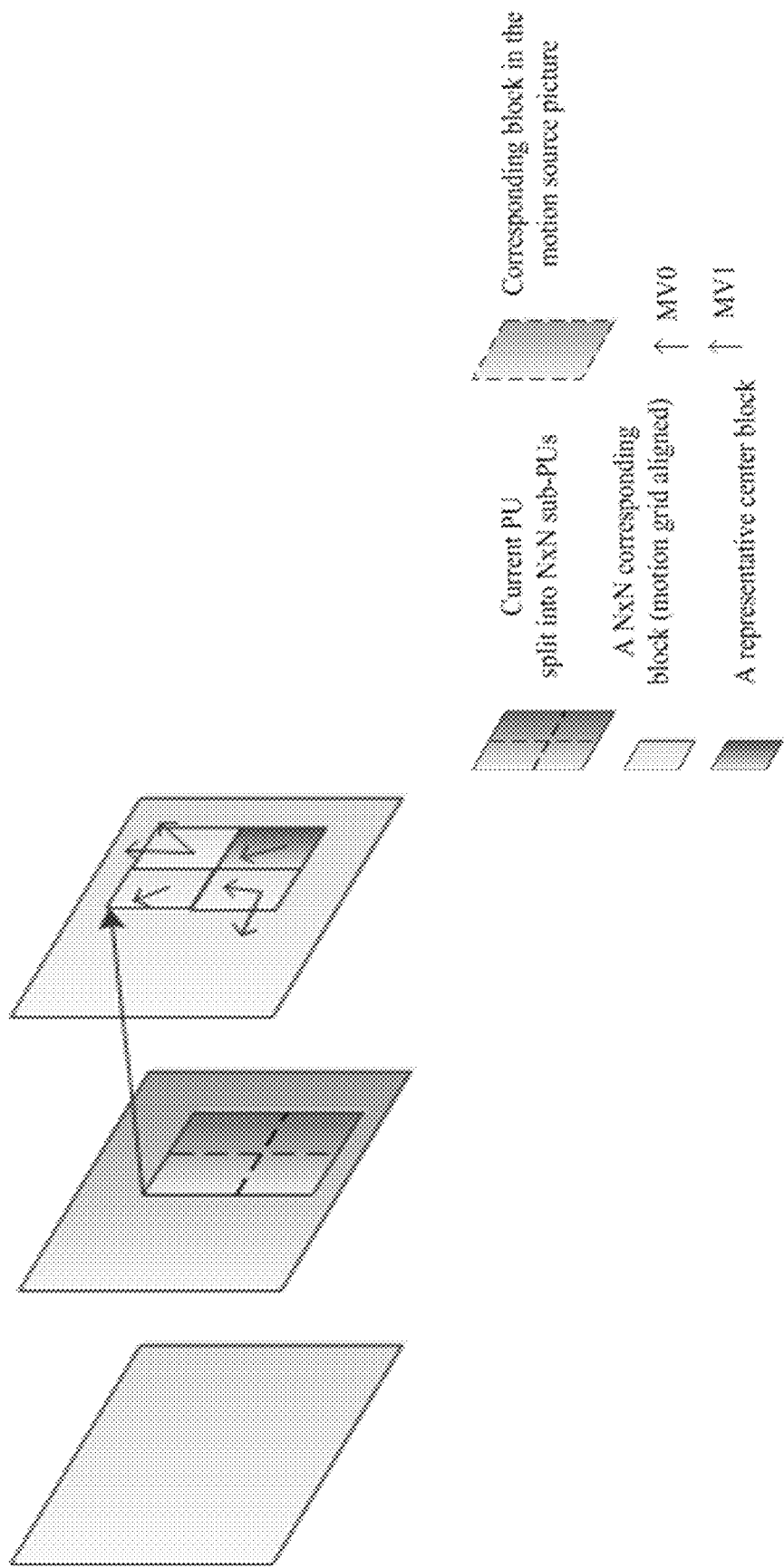
FIG. 18 shows an example Alternative Temporal Motion Vector Prediction (ATMVP for motion prediction of a coding unit (CU).

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 18, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 18.

Figure 19:
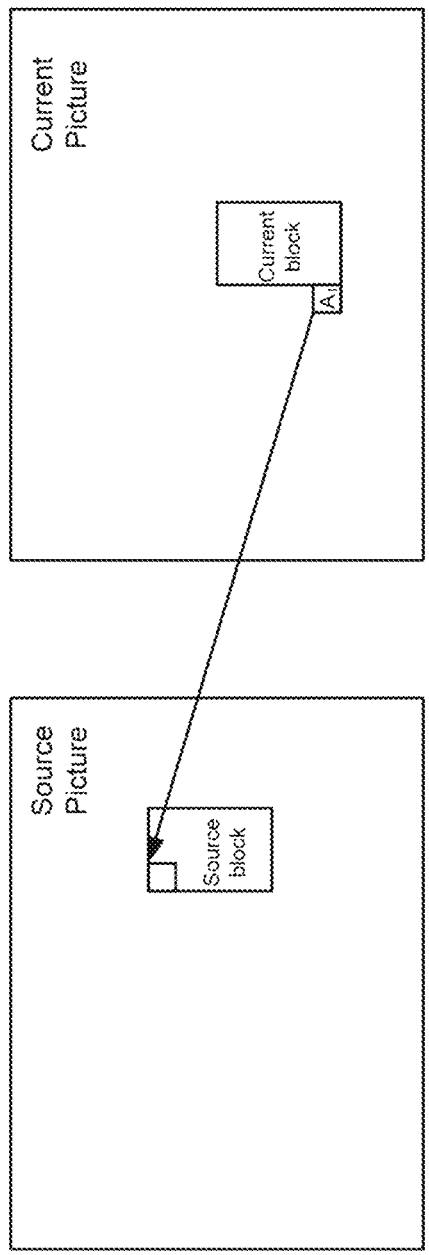
FIG. 19 pictorially depicts an example of identification of a source block and a source picture.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU. In one example, if the first merge candidate is from the left neighboring block (e.g., Ai in FIG. 19), the associated MV and reference picture are utilized to identify the source block and source picture.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g., the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.3.1.2 Spatial-Temporal Motion Vector Prediction

Figure 20:
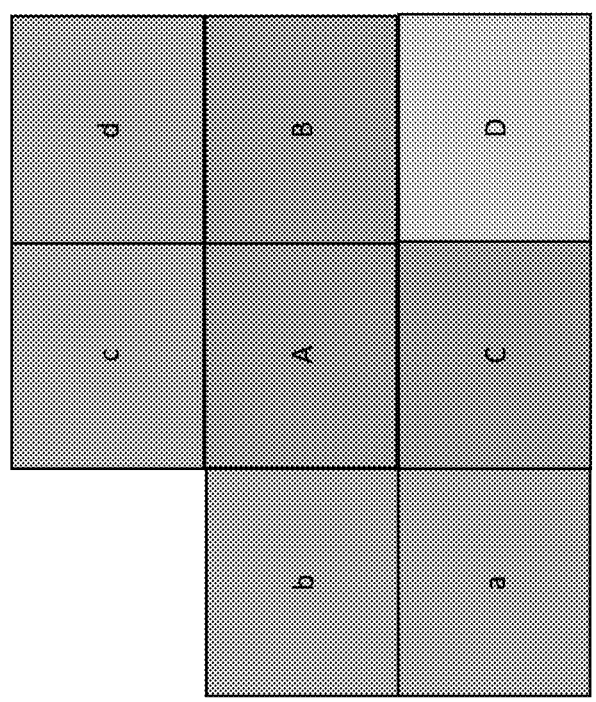
FIG. 20 shows an example of one CU with four sub-blocks and neighboring blocks.

In this method, the motion vectors of the sub-CUs are derived recursively, following raster scan order. FIG. 20 illustrates an example of one CU with four sub-blocks (A-D) and its neighbouring blocks (a-d). Consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.3.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index are context coded by CABAC. While in HEVC, only the first bin is context coded and the remaining bins are context by-pass coded.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3.3 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (1), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (1)}$$

Figure 21:
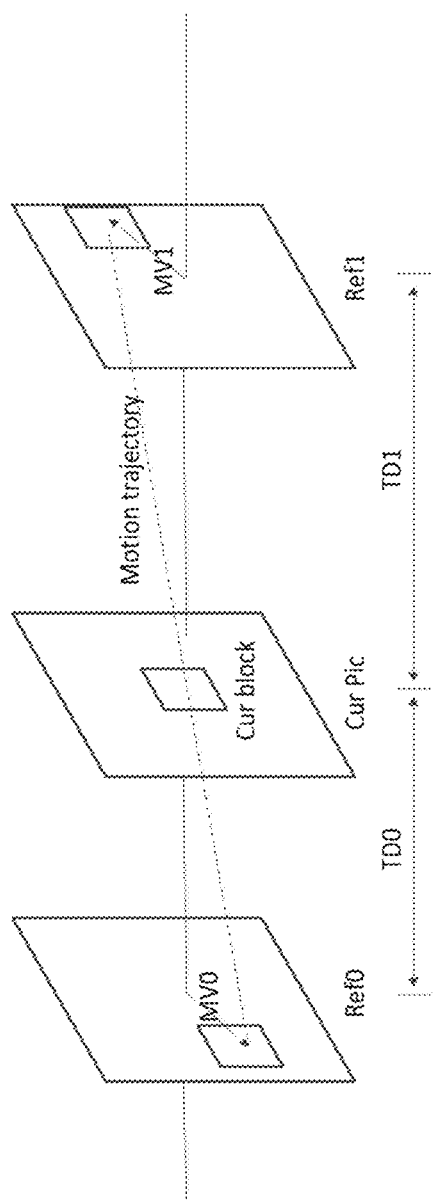
FIG. 21 illustrates an example of bilateral matching.

As shown in the FIG. 21, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, e.g., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 22:
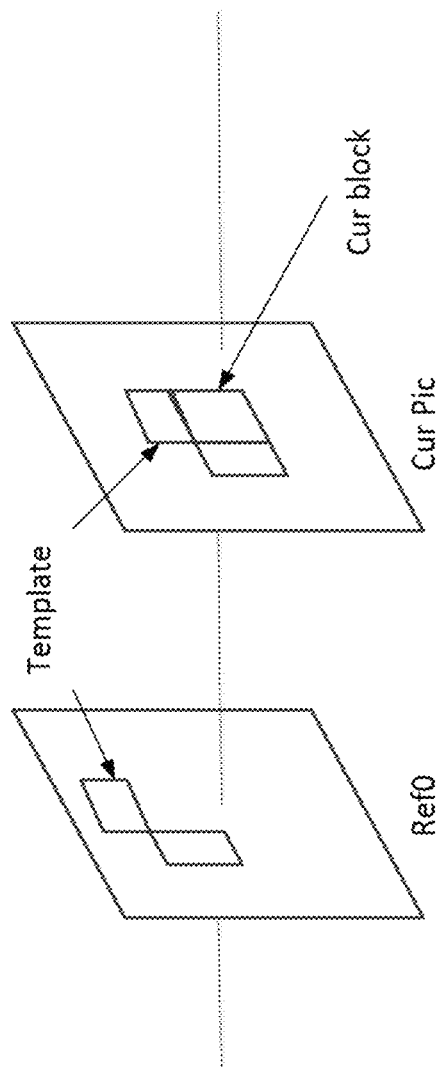
FIG. 22 illustrates an example of template matching.

As shown in FIG. 22, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.3.3.1 CU Level MV Candidate Set

The MV Candidate Set at CU Level Includes:
 (i) Original AMVP candidates if the current CU is in AMVP mode
 (ii) all merge candidates,
 (iii) several MVs in the interpolated MV field, which is introduced in section [00175].
 (iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.3.3.2 Sub-CU Level MV Candidate Set

The MV Candidate Set at Sub-CU Level Includes:
 (i) an MV determined from a CU-level search,
 (ii) top, left, top-left and top-right neighbouring MVs,
 (iii) scaled versions of collocated MVs from reference pictures,
 (iv) up to 4 ATMVP candidates,
 (v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones. At the sub-CU level, up to 17 MVs are added to the candidate list.

2.3.3.3 Generation of Interpolated MV Field

Before coding a frame, interpolated motion field is generated for the whole picture based on unilateral ME. Then the motion field may be used later as CU level or sub-CU level MV candidates.

Figure 23:
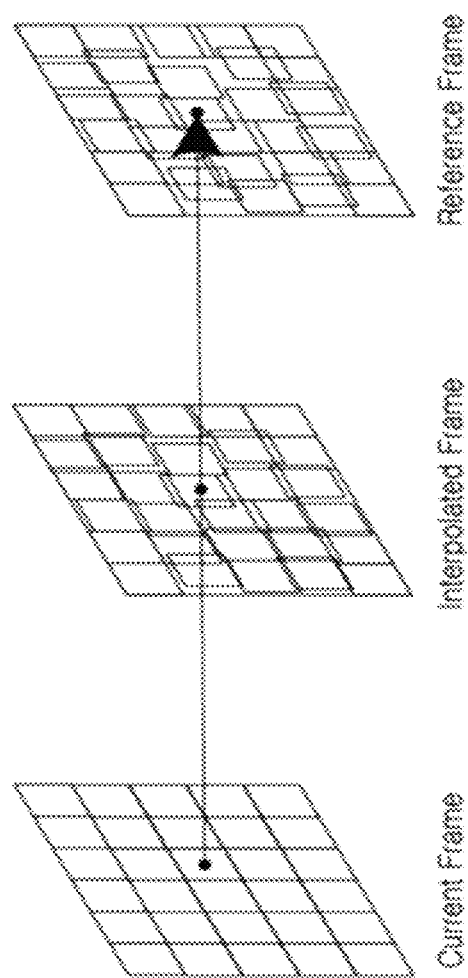
FIG. 23 depicts an example of unilateral Motion Estimation (ME) in Frame Rate Up Conversion (FRUC).

First, the motion field of each reference pictures in both reference lists is traversed at 4×4 block level. For each 4×4 block, if the motion associated to the block passing through a 4×4 block in the current picture (as shown in FIG. 23) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.3.3.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (2)}$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.3.3.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.3.3.6 Selection of Prediction Direction in Template Matching FRUC Merge Mode In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
``` where cost0 is the SAD of list0 template matching, cost1 is the SAD of list1 template matching and costBi is the SAD of bi-prediction template matching. The value of factor is equal to 1.25, which means that the selection process is biased toward bi-prediction. The inter prediction direction selection is only applied to the CU-level template matching process.

2.3.4 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
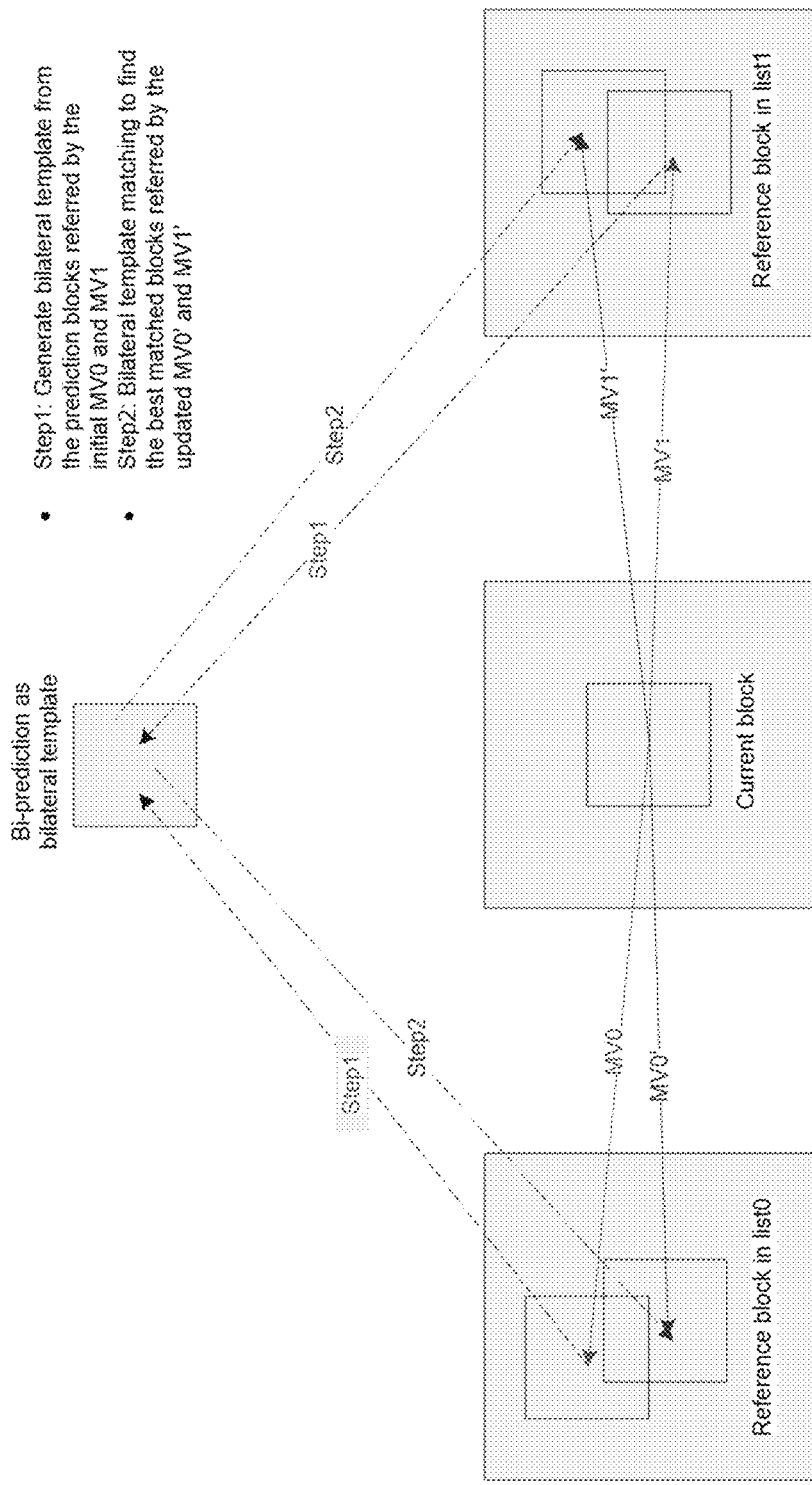
FIG. 24 shows an example of Decoder-Side Motion Vector Refinement (DMVR) based on bilateral template matching.

In DMVR, a bilateral template is generated as the weighted combination (i.e. average) of the two prediction blocks, from the initial MV0 of list0 and MV1 of list1, respectively, as shown in FIG. 23. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

3. Example Problems and Embodiments

Several problems have been identified with regard the current coding techniques.

First, for different partition trees like BT or TT, a parent node may have two or three child nodes, such as one block is split to two or three sub-blocks. In current design, the two or three child nodes may share the same motion information. In this case, unnecessary overheads to signal the motion information may be required. Instead of coding multiple child nodes, a smart encoder can code the block as a whole without further splitting to reduce signaling overhead. Alternatively, child nodes may have different motion information to avoid redundant signaling in the bitstream.

Second, the MER was designed to cover a N×N region, mainly for considering the square CU or CTU design in HEVC. However, in VVC, non-square CU or even non-square CTU may appear. There is a need for the MER to be adaptive to non-square CU/CTU.

Third, currently, only one TMVP candidate can be added to the merge candidate list.

Adding more temporal merge candidates are expected to provide additional coding gains.

Lastly, combined bi-prediction merge candidate is only one way to generate some virtual merge candidate (e.g., not directly copied/scaled from spatial/temporal neighbouring blocks). It is desirable to develop different ways to generate virtual merge candidates, which may bring additional benefits.

The example embodiments below illustrate various techniques that can be implemented to address the problems mentioned above.

Examples Related to MER

Example A1

MER region size may depend on the partition type (e.g., QT, BT or TT) and/or block shape (square or non-square) and/or block sizes and/or temporal layer index of the current picture.
  a. In some embodiments, MER region sizes may be signaled in the bitstream, e.g., in sequence parameter set (SPS), picture parameter set (PPS), slice header etc.

Example A2

A non-square MER region of M×N (M is unequal to N) can be introduced to allow the encoder/decoder to do parallel coding.
  a. In one example, two separate syntax elements to indicate the width and height of the MER region may be transmitted in the bitstream, e.g., sequence parameter set (SPS), picture parameter set (PPS), slice header etc.
  b. In another example, for each partition type (e.g., QT, BT, ABT or TT) and/or block shape (square or non-square), separate indications of width and height of the MER region may be transmitted in the bitstream, e.g., sequence parameter set (SPS), picture parameter set (PPS), slice header etc.
  c. In some embodiments, prediction coding of two syntax elements may be applied to save some overhead for indications of width/height of the MER region.
  d. In some embodiments, one flag may be signaled to indicate whether the two/multiple syntax elements share the same sizes.

Examples Related to Restriction of Motion Information Due to Partitions

Example B1

For one partition type (e.g., QT, BT, ABT or TT), one block may be split to M sub-blocks (M>=2). A restriction may be imposed such that not all of the M sub-blocks share the same motion information, which includes reference pictures, motion vectors, IC flags, affine flags, and so on.
  a. If the first N (e.g., N=M−1) sub-blocks are coded with the same motion information, the remaining sub-block(s) (e.g., the last sub-block) do not have the same motion information.
  b. In one example, the signaling of motion information of the remaining sub-block(s) (e.g., the last sub-block) in the coding order is avoided if they use the same motion information.
    i. When the first subset of sub-blocks (e.g., the first M−1 sub-blocks) is coded with the same motion information, if the remaining subset of sub-blocks (e.g., the last sub-block) is coded with the merge mode, the merge index does not correspond to the motion information of a spatial neighboring block covered by any of the first subset of sub-blocks (e.g., the M−1 sub-blocks). In other words, a merge index that corresponds to the motion information of a spatial neighboring block covered by any of the first subset of sub-blocks (e.g., the M−1 sub-blocks) is not signaled in the bitstream (e.g., for bitstream conformance reasons).
    ii. When the first subset of sub-blocks (e.g., the first M−1 sub-blocks) is coded with the same motion information, if the remaining subset of sub-blocks (e.g., the last sub-block) is coded with the merge mode, the merge candidate providing the same motion information of the first subset of sub-blocks (e.g., the previous M−1 sub-blocks) is removed from the merge candidate list.
    iii. When the first subset of sub-blocks (e.g., the first M−1 sub-blocks) is coded with the same motion information, if the remaining subset of sub-blocks (e.g., the last sub-block) is coded with the AMVP mode and the coded reference pictures are the same as those for the first subset of sub-blocks (e.g., the M−1 sub-blocks), the decoded AMVP MV predictor candidate index does not correspond to the motion information of a spatial neighboring block covered by any of the first subset of sub-blocks (e.g., M−1 sub-blocks). In other words, if any one of the MV predictor candidate index could result in the same motion information, the signaling is modified to skip the indication of this MV predictor candidate. Alternatively, furthermore, if there are only two AMVP candidates, the signaling of MV predictor candidate index can be skipped.
    iv. When the first subset of sub-blocks (e.g., the first M−1 sub-blocks) is coded with the same motion information, if the remaining subset of sub-blocks (e.g., the last sub-block) is coded with the DMVR mode, the cost calculation of the refined motion information which are identical to those for the first subset of sub-blocks (e.g., the M−1 sub-blocks) is skipped and the cost value is considered to a maximum value.
    v. When the first subset of sub-blocks (e.g., the first M−1 sub-blocks) is coded with the same motion information, if the remaining subset of sub-blocks (e.g., the last sub-block) is coded with the FRUC mode, the cost calculation of the motion information which are identical to those for the first subset (e.g., the M−1 sub-blocks) is skipped and the cost value is considered to a maximum value.

Example B2

Restrictions can be imposed such that merge candidates may not be obtained from a neighboring block which can form a parent node together with the current block.

Figure 26A:
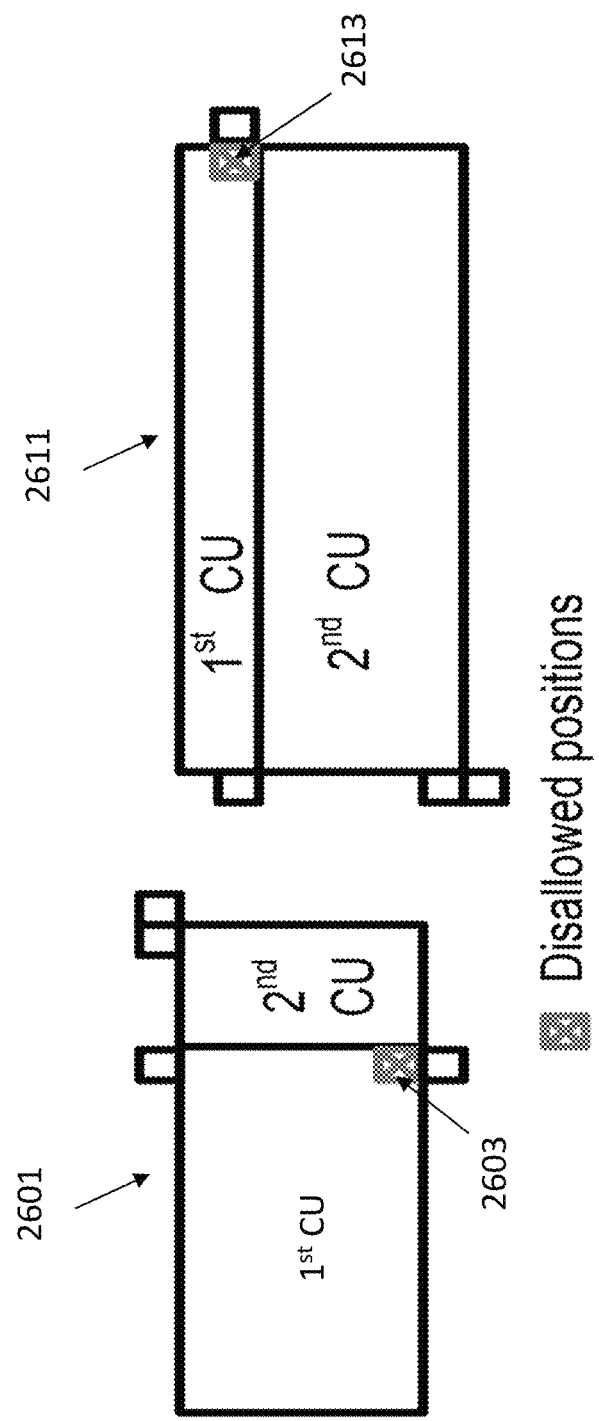
FIG. 26A illustrates an example of a second CU under an Asymmetric Binary Tree (ABT) partition structure in accordance with one or more embodiments of the disclosed technology.
Figure 26B:
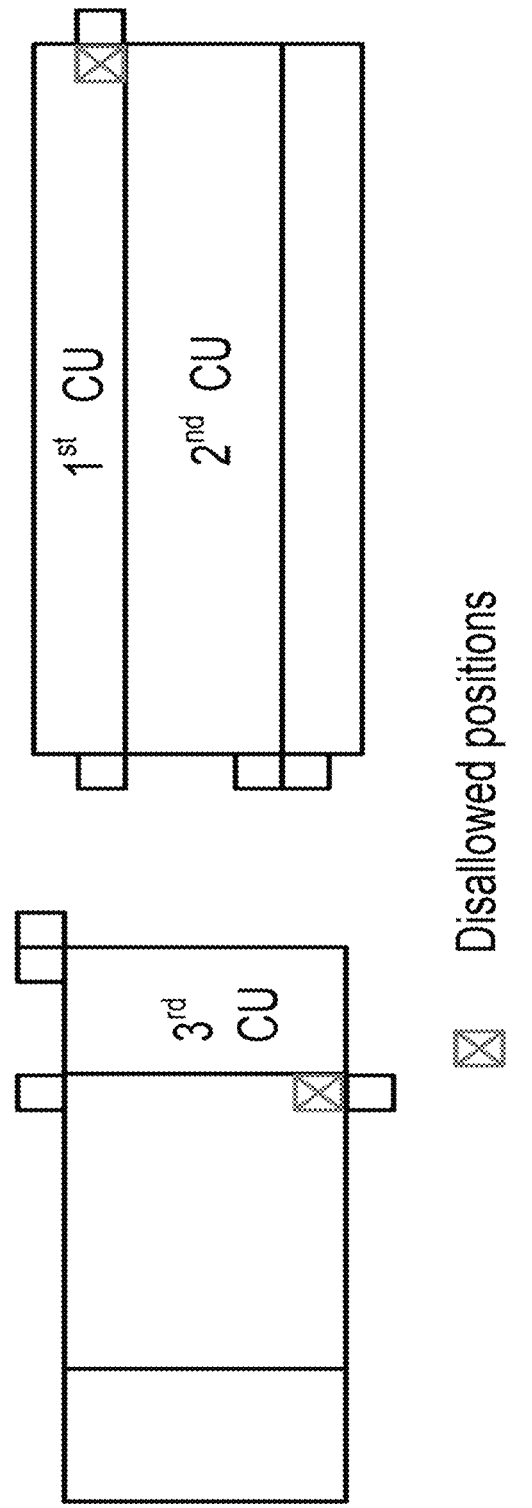
FIG. 26B illustrates an example of CUs under a Ternary Tree (TT) partition in accordance with one or more embodiments of the disclosed technology.

As discussed above, a maximum of four merge candidates are selected among candidates located in the positions depicted in FIG. 10. A subset of these positions that are located within the parent node can be marked as restricted or disallowed so that the merge candidates are determined based on neighboring blocks outside of the parent node.

a. In one example, when deriving the merge candidate list for the BT or ABT case, the second partition (e.g., the second child node) of a parent node does not utilize any neighboring block located in the first BT or ABT partition (e.g., first child node). FIGS. 26A-26B show some examples. FIG. 26A shows examples of a $2^{nd}$ CU of a parent node under ABT partition structures in accordance with one or more embodiments of the disclosed technology. In the left section of FIG. 26A, a parent node 2601 is split into two CUs using an ABT partition structure. A neighboring block 2603 in the first CU is considered to be in a disallowed position. Thus, the merge candidates are derived solely based on the neighboring blocks of the parent node 2611 regardless of how the CUSs are partitioned—that is, the neighboring blocks located outside of the parent node. In the right section of FIG. 26A, a parent node 2611 is split into two CUs using another ABT partition structure. A neighboring block 2613 in the first CU is disallowed, thus the merge candidates are derived solely based on the neighboring blocks of the parent node 2611. FIG. 26B shows examples of CUs under TT partition structures in accordance with one or more embodiments of the disclosed technology. In the left section of FIG. 26B, a neighboring block of $3^{rd}$ CU (in the $2^{nd}$ CU) is considered to be in a disallowed position. The merge candidates are derived solely based on the neighboring blocks of the parent node regardless of the TT partition structure. Similarly, in the right section of FIG. 26B, a neighboring block of the $2^{nd}$ CU (positioned in the $1^{st}$ CU) is considered to be in a disallowed position. Thus, the merge candidates are derived based on solely the neighboring blocks of the parent node regardless of the partition structure. Similar restrictions can be applied to other partition structures (e.g., QT) as well.

b. In one example, when deriving the merge candidate list for the TT case, the second or the third partition (e.g., the second or the third child node) does not utilize any neighboring block located in the first TT partition and/or the second TT partition.

c. Alternatively, furthermore, if there are some neighboring blocks at the disallowed positions, additional neighboring blocks may be further accessed to derive merge candidates.

i. In one example, a new position is accessed and treated as the replacement of the disallowed position. In this case, the derived merge candidate from the new position is used as a replacement of the merge candidate derived from the disallowed positions.

ii. Alternatively, all the allowed positions are firstly checked in order, followed by new positions. In this case, the derived merge candidates from new positions may only be added after all the merge candidates derived from allowed positions.

iii. Alternatively, certain order may be defined to add merge candidates from allowed and new positions. In this case, for different CUs, different order may be utilized to add merge candidates derived from different positions.

Example B3

The above restrictions in Example B1 and B2 can also be applicable to the AMVP candidate derivation process.

Examples Related to Merge Candidates

Example C1

Virtual merge candidate(s) derived by modifying a motion vector and/or a reference picture of an available merge candidate can be added to the merge candidate list. For example, virtual merge candidates can be derived by scaling motion vectors of one available merge candidate to different reference pictures.

a. In one example, prediction direction is inherited from the available merge candidate, and motion vector and reference picture index are modified.

i. For each available reference picture list (prediction direction from L0 or L1), the associated motion vector may be scaled to a different reference picture in the same reference picture list, or the other reference picture list.

ii. If the available merge candidate corresponds to bi-prediction, one virtual merge candidate may be derived by modifying the motion information of only one reference picture list. In one example, for one reference picture list, the associated reference picture (or reference picture index) and motion vector is inherited by the virtual merge candidate, while for the other reference picture list, the associated reference picture (or reference picture index) and motion vector may be modified by scaling the motion vector to a different reference picture in the same reference picture list.

b. In one example, if the available merge candidate corresponds to uni-prediction, the prediction direction of the virtual merge candidate may be modified to be bi-prediction.

i. For the available reference picture list (uni-prediction corresponding to, e.g., List X), the associated reference picture (or reference picture index) and motion vector is inherited by the virtual merge candidate, while for List (1−X), the motion vector may be derived by scaling the motion vector from List X to a reference picture in the other reference picture list (List (1−X)) and the reference picture (or reference picture index) is set to the reference picture in List (1−X) where the motion vector is scaled to.

1. When the reference picture in List (1−X) is same with the reference picture in List X, motion vector in List (1−X) is derived by adding an arbitrary offset to the motion vector in List X. For example, offset (−1, 0), (0, −1), (1, 0), (0, 1) etc. al, may be added to the motion vector.

c. Multiple virtual merge candidates may be derived by selecting one available merge candidate, but scaled to multiple reference pictures.

d. Multiple virtual merge candidates may be derived by selecting multiple available merge candidates but for one selected available merge candidate, only one virtual merge candidate may be derived.

i. Alternatively, for one selected available merge candidate, M (M>1) virtual merge candidate may be derived.

e. The selection of one or more available merge candidates may depend on:
  i. Based on the inserted order of the available merge candidates. In one example, only the first N candidates may be used to derive the virtual merge candidates
  ii. Based on whether one available merge candidate corresponds to bi-prediction
  iii. Based on the type of the merge candidates (spatial merge candidates, temporal merge candidates, combined bi-prediction merge candidates, zero motion vector merge candidates, sub-block merge candidates). In one example, only spatial merge candidates may be used to derive virtual merge candidates.
  iv. Based on the coded modes of the merge candidates (affine or non-affine motion, illumination compensation (IC) enabled or disabled). In one example, only non-affine and non-IC merge candidates may be used to derive virtual merge candidates.
  v. Based on the size and shape of the current block.
  vi. Based on the coding modes of neighboring blocks.
f. The selection of one or more reference pictures where motion vectors are to be scaled to may depend on:
  i. reference picture index. In one example, reference pictures with smaller reference indices are selected, e.g. reference picture index equal to 0.
  ii. The picture order count (POC) difference between one reference picture and the reference picture associated with the selected available merge candidate. In one example, a reference picture for each reference picture list with smallest POC difference is chosen.
  iii. The quantization parameter (QP) difference between one reference picture and the reference picture associated with the selected available merge candidate. In one example, a reference picture for each reference picture list with smallest QP difference is chosen.
  iv. The temporal layers of reference pictures. In one example, a reference picture with the lowest temporal layer is chosen.
g. Virtual merge candidates may be added to the merge candidate list at certain positions, such as before TMVP, or after TMVP but before combined bi-predictive merge candidates, or after combined bi-predictive merge candidates.
  i. When multiple virtual merge candidates may be added, those Bi-prediction based merge candidates have a higher priority compared to uni-prediction based merge candidates, i.e., bi-prediction candidates are added before uni-prediction candidates.
  ii. When multiple reference pictures may be used to scale motion vectors associated with a selected merge candidate, the order of reference pictures may be as follows:
    1. Based on the increasing order of reference picture index.
    2. Pictures in List 0 are checked before pictures in List 1 or vice versa.
    3. Pictures in List 0 and List 1 are checked interleaved according to the reference picture index.
    4. In one example, for bi-prediction, keep the list 1 motion information unchanged, but loop all the reference pictures in List 0 according to increasing order of reference picture index; then keep the list 0 motion information, but loop all the reference pictures in List 1 according to increasing order of reference picture index. Alternatively, keep the list 0 motion information unchanged, but loop all the reference pictures in List 1 according to increasing order of reference picture index; then keep the list 1 motion information, but loop all the reference pictures in List 0 according to increasing order of reference picture index. Alternatively, scale motion information to the two reference pictures with index equal to 0, then scale to two reference pictures with index equal to 1, and so on.
h. Virtual merge candidates may have more than two reference blocks, i.e. multiple hypothesis with more than two references.

Example C2

Figure 25:
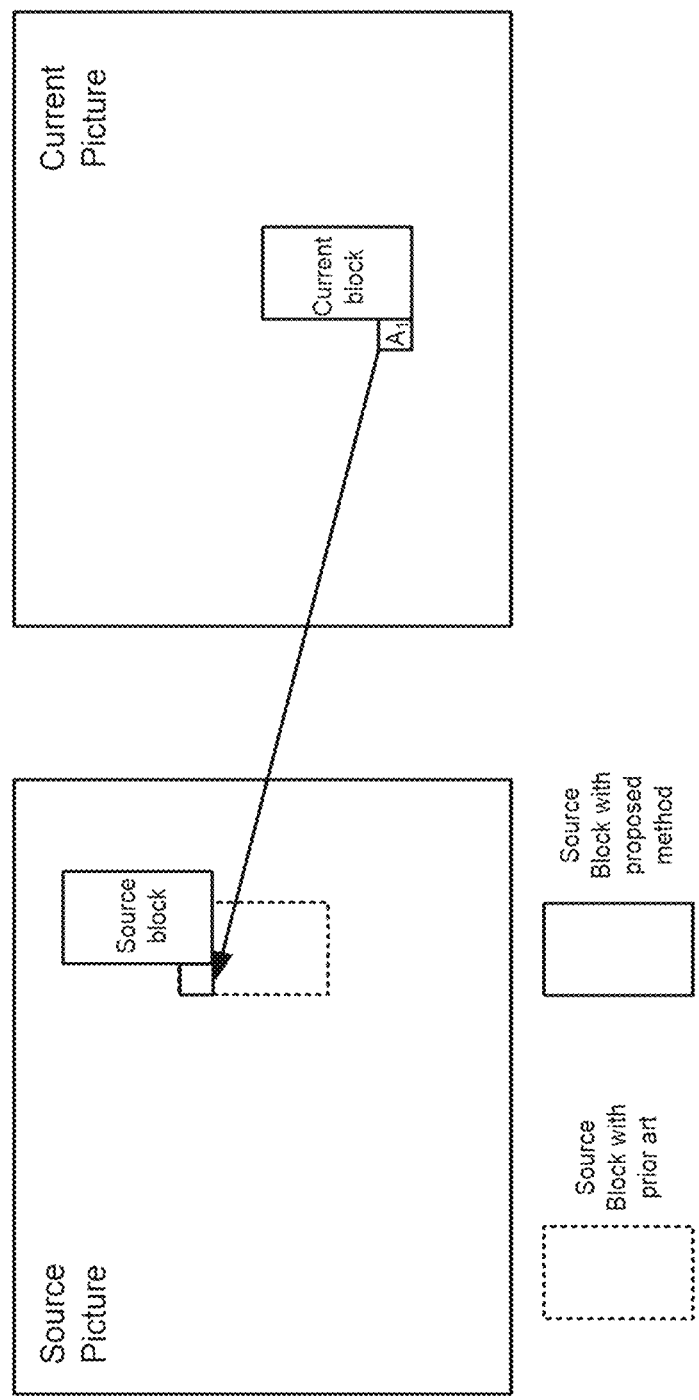
FIG. 25 illustrates an example of source block identification.

Sub-block motion candidates may be obtained from a block identified by motion vector(s) of a spatial merge candidate and the relative positions between the current block and the block wherein spatial merge candidate is from.
  a. An illustrative example is depicted in FIG. 25 which shows illustrative examples of source block identification.
  b. The concept of adding the relative position between a spatial neighboring block and the current block may be also applied to sub-block motion candidates for intra block copy (IBC) merge within current frame or affine merge. In this case, the source picture will be the same as the current picture. The concept can also be applied for ATMVP in a different picture from the current picture of the current block.

Example C3

During the TMVP derivation process, the co-located block may be identified by a non-zero motion vector instead of choosing the co-located position (zero motion vector).
  a. The non-zero motion vector may be derived from a spatial merge candidate.
  b. In one example, the same way as used in ATMVP may be utilized, such as the first merge candidate by scaling the motion vector to the co-located picture, if necessary.
  c. Alternatively, the co-located picture may be also modified, such as set to the reference picture associated with one spatial merge candidate.

Example C4

Figure 26C:
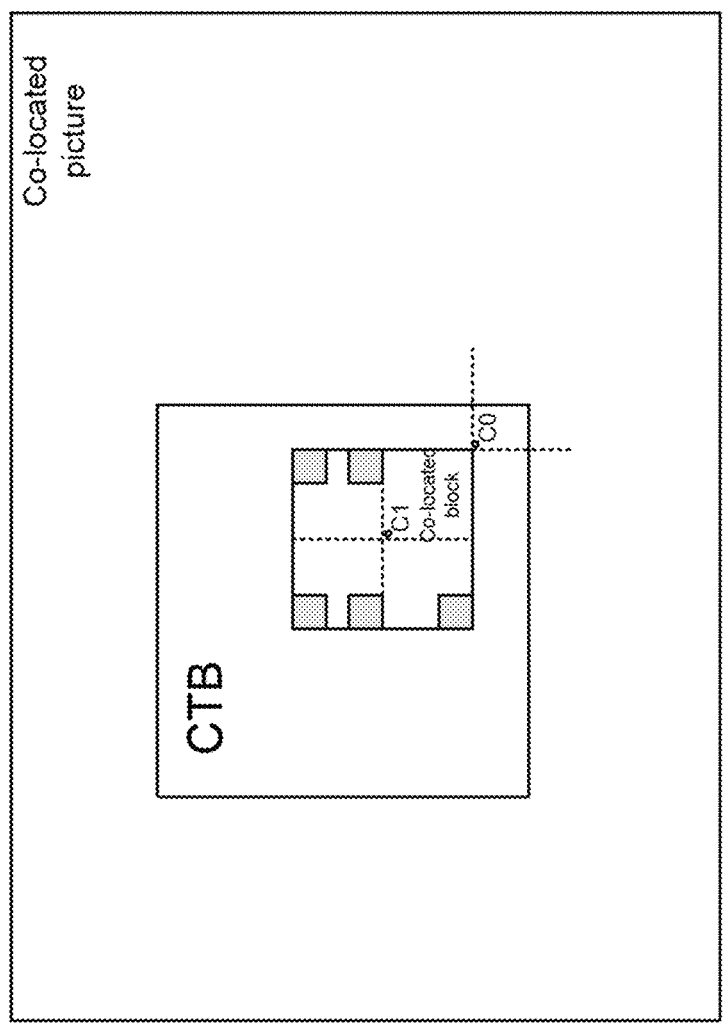
FIG. 26C illustrates an example of multiple blocks for Temporal Motion Vector Prediction (TMVP) candidate derivation outside the col-located block in accordance with one or more embodiments of the disclosed technology.
Figure 26D:
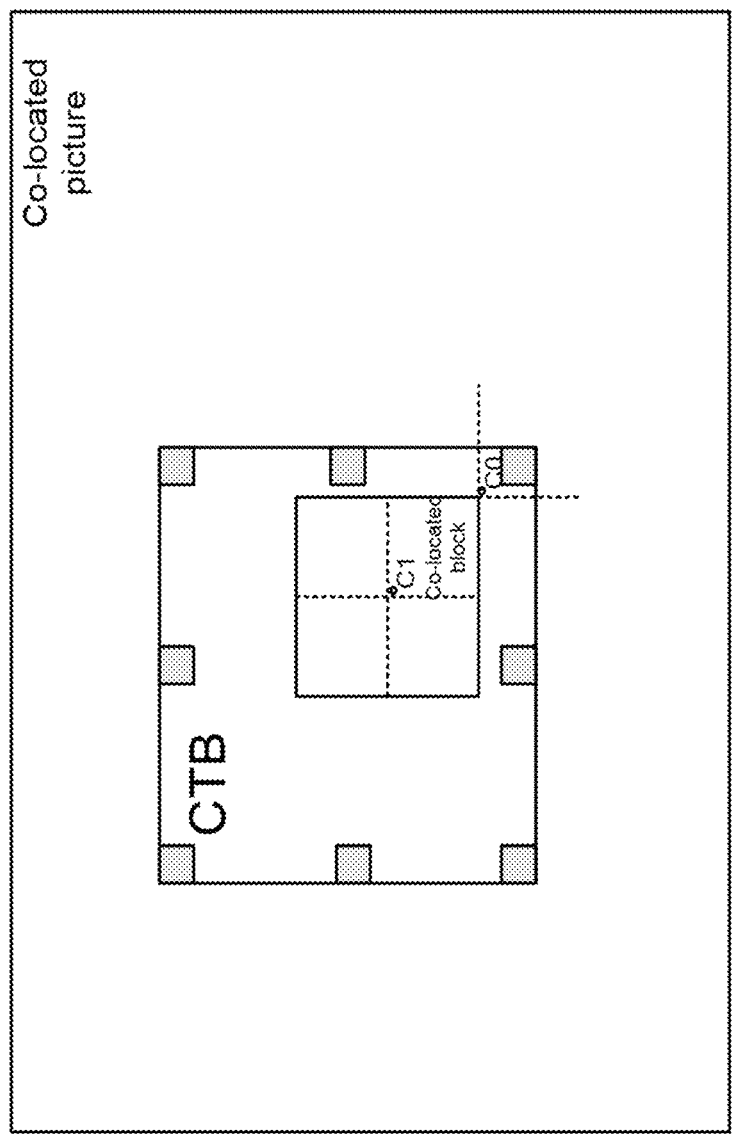
FIG. 26D illustrates an example of multiple blocks for TMVP candidate derivation within the col-located Coding Tree Unit (CTU) in accordance with one or more embodiments of the disclosed technology.
Figure 26E:
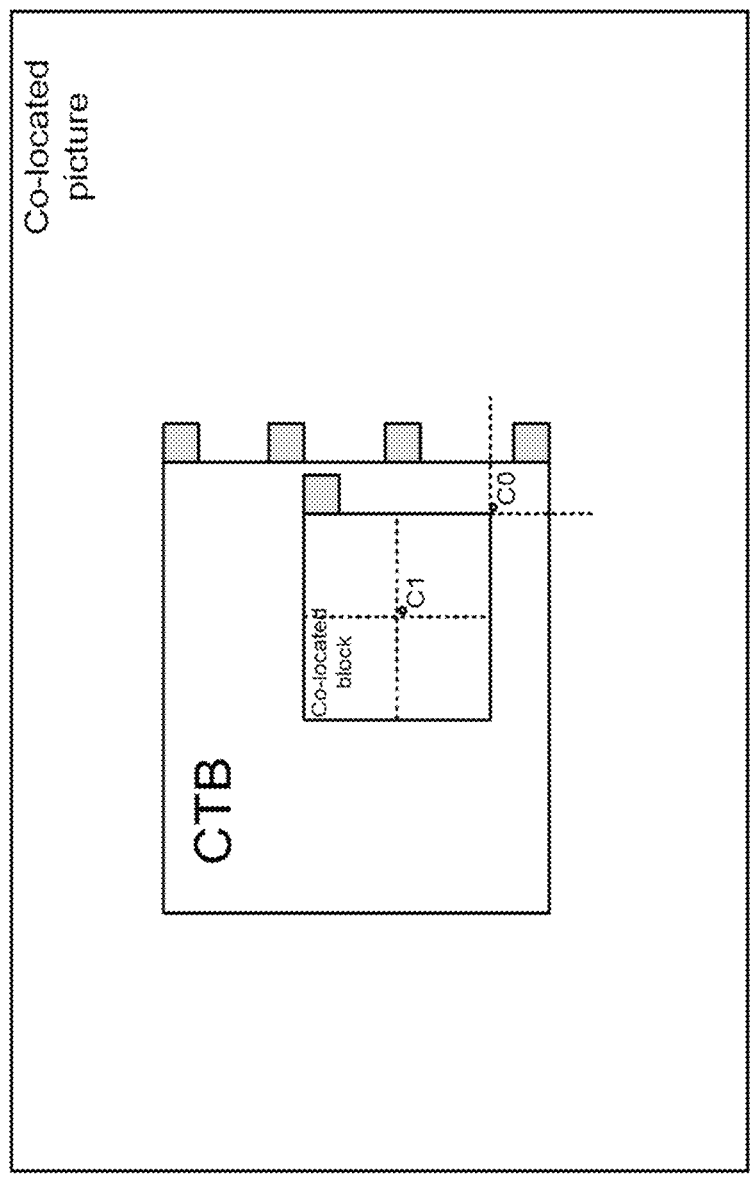
FIG. 26E illustrates an example of multiple blocks for TMVP candidate derivation outside the col-located block in accordance with one or more embodiments of the disclosed technology.

Multiple blocks from one or multiple col-pictures may be used to derive multiple TMVP candidates.
  a. In one example, the multiple blocks may be located within the co-located block wherein the co-located block is the block with the same relative position to the top-left of the co-located picture as the current block, and with the same size as the current block.
  b. In one example, the multiple blocks may be located within the co-located CTB wherein the co-located CTB is the CTB covering the co-located block.
  c. In one example, the multiple blocks may be located outside the co-located block, and/or co-located CTB.
  d. Alternatively, furthermore, in above examples, the co-located block may be defined in different ways, i.e., pointed by a motion vector derived from some merge candidate or derived from motion information of spatial neighboring block(s). FIG. 26C shows an example of multiple blocks for TMVP candidate derivation outside the col-located block (some may be also outside the co-located). FIG. 26D shows an example of multiple blocks for TMVP candidate derivation within the col-located Coding Tree Unit (CTU). FIG. 26E shows an example of multiple blocks for TMVP candidate derivation outside the col-located block (some may also be outside the co-located.

Example C5

For those newly introduced candidates, full pruning or partial pruning may be applied.
  a. For full pruning, one new candidate should be checked with all the other available candidates (inserted before the new candidate) to see whether any two of them are identical. If the new candidate is identical to any one, the new candidate is not added to the candidate list.
  b. For partial pruning, one new candidate should be checked with partial of other available candidates (inserted before the new candidate) to see whether any two of them are identical.

Another embodiment is given as follows. This specific embodiment illustrates changes that can be made to the currently defined HEVC coding standard to accommodate some implementations of the disclosed technology. The section numbers below refer to the corresponding section numbers in the HEVC standard document. In the text, underlined text represents addition and strikethrough indicates deletion to the current standard. Furthermore, the designation "X" and "Y" are added to variable names to indicate the two new bit fields defined for the bitstream.

7.3.2.3 Picture Parameter Set RBSP Syntax
7.3.2.3.1 General Picture Parameter Set RBSP Syntax

|  | Descriptor |
|---|---|
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   ... |  |
|   pps_scaling_list_data_present_flag | u(1) |
|   if( pps_scaling_list_data_present_flag) |  |
|     scaling_list_data( ) |  |
|   lists_modification_present_flag | u(1) |
|   ~~log2_parallel_merge_level_minus2~~ | ~~ue(v)~~ |
|   <u>log2X_parallel_merge_level_minus2</u> | <u>ue(v)</u> |
|   <u>log2Y_parallel_merge_level_minus2</u> | <u>ue(v)</u> |
|   slice_segment_header_extension_present_flag | u(1) |
|   pps_extension_present_flag | u(1) |
|   ... |  |
|   rbsp_trailing_bits( ) |  |
| } |  | log 2X_parallel_merge_level_minus2 plus 2 specifies the value of the variable Log 2XParMrgLevel, which is used in the derivation process for luma motion vectors for merge mode as specified in clause 8.5.3.2.2 and the derivation process for spatial merging candidates as specified in clause 8.5.3.2.3. The value of log 2X_parallel_merge_level_minus2 shall be in the range of 0 to CtbLog 2SizeY−2, inclusive.

The variable Log 2ParMrgLevel is derived as follows:

$$\text{Log }2X\text{ParMrgLevel}=\log 2X\_parallel\_merge\_level\_minus2+2 \quad (7\text{-}37)$$

log 2Y_parallel_merge_level_minus2 plus 2 specifies the value of the variable Log 2YParMrgLevel, which is used in the derivation process for luma motion vectors for merge mode as specified in clause 8.5.3.2.2 and the derivation process for spatial merging candidates as specified in clause 8.5.3.2.3. The value of log 2Y_parallel_merge_level_minus2 shall be in the range of 0 to CtbLog 2SizeY−2, inclusive.

The variable Log 2YParMrgLevel is derived as follows:

$$\text{Log }2Y\text{ParMrgLevel}=\log 2Y\_parallel\_merge\_level\_minus2+2 \quad (7\text{-}37)$$

Derivation Process for Spatial Merging Candidates
Inputs to this process are:
  a luma location (xCb, yCb) of the top-left sample of the current luma coding block relative to the top-left luma sample of the current picture,
  a variable nCbS specifying the size of the current luma coding block,
  a luma location (xPb, yPb) specifying the top-left sample of the current luma prediction block relative to the top-left luma sample of the current picture,
  two variables nPbW and nPbH specifying the width and the height of the luma prediction block,
  a variable partIdx specifying the index of the current prediction unit within the current coding unit.
Outputs of this process are as follows, with X being 0 or 1:
  the availability flags availableFlag$A_0$, availableFlag$A_1$, availableFlag$B_0$, availableFlag$B_1$, and availableFlag$B_2$ of the neighbouring prediction units,
  the reference indices refIdxLX$A_0$, refIdxLX$A_1$, refIdxLX$B_0$, refIdxLX$B_1$, and refIdxLX$B_2$ of the neighbouring prediction units,
  the prediction list utilization flags predFlagLX$A_0$, predFlagLX$A_1$, predFlagLX$B_0$, predFlagLX$B_1$, and predFlagLX$B_2$ of the neighbouring prediction units,
  the motion vectors mvLX$A_0$, mvLX$A_1$, mvLX$B_0$, mvLX$B_1$, and mvLX$B_2$ of the neighbouring prediction units.

For the derivation of availableFlag$A_1$, refIdxLX$A_1$, predFlagLX$A_1$, and mvLX$A_1$ the following applies:
  The luma location (xNb$A_1$, yNb$A_1$) inside the neighbouring luma coding block is set equal to (xPb−1, yPb+nPbH−1).
  The availability derivation process for a prediction block as specified in clause 6.4.2 is invoked with the luma location (xCb, yCb), the current luma coding block size nCbS, the luma prediction block location (xPb, yPb), the luma prediction block width nPbW, the luma prediction block height nPbH, the luma location (xNb$A_1$, yNb$A_1$), and the partition index partIdx as inputs, and the output is assigned to the prediction block availability flag available$A_1$.
  When one or more of the following conditions are true, available$A_1$ is set equal to FALSE:
  xPb>>Log 2XParMrgLevel is equal to xNb$A_1$>>Log 2XParMrgLevel and yPb>>Log 2YParMrgLevel is equal to yNb$A_1$>>Log 2YParMrgLevel.
  PartMode of the current prediction unit is equal to PART_Nx2N, PART_nLx2N, or PART_nRx2N, and partIdx is equal to 1.
  The variables availableFlag$A_1$, refIdxLX$A_1$, predFlagLX$A_1$, and mvLX$A_1$ are derived as follows:
For the derivation of availableFlag$B_1$, refIdxLX$B_1$, predFlagLX$B_1$, and mvLX$B_1$ the following applies:
  The luma location (xNb$B_1$, yNb$B_1$) inside the neighbouring luma coding block is set equal to (xPb+nPbW−1, yPb−1).
  The availability derivation process for a prediction block as specified in clause 6.4.2 is invoked with the luma location (xCb, yCb), the current luma coding block size nCbS, the luma prediction block location (xPb, yPb), the luma prediction block width nPbW, the luma prediction block height nPbH, the luma location (xNbB$_1$, yNbB$_1$), and the partition index partIdx as inputs, and the output is assigned to the prediction block availability flag availableB$_1$.

When one or more of the following conditions are true, availableB$_1$ is set equal to FALSE:

xPb>>Log 2XParMrgLevel is equal to xNbB$_1$>>Log 2XParMrgLevel and yPb>>Log 2YParMrgLevel is equal to yNbB$_1$>>Log 2YParMrgLevel.

PartMode of the current prediction unit is equal to PART_2N×N, PART_2NxnU, or PART_2NxnD, and partIdx is equal to 1.

The variables availableFlagB$_1$, refIdxLXB$_1$, predFlagLXB$_1$, and mvLXB$_1$ are derived as follows:

For the derivation of availableFlagB$_0$, refIdxLXB$_0$, predFlagLXB$_0$, and mvLXB$_0$ the following applies:

The luma location (xNbB$_0$, yNbB$_0$) inside the neighbouring luma coding block is set equal to (xPb+nPbW, yPb−1).

The availability derivation process for a prediction block as specified in clause 6.4.2 is invoked with the luma location (xCb, yCb), the current luma coding block size nCbS, the luma prediction block location (xPb, yPb), the luma prediction block width nPbW, the luma prediction block height nPbH, the luma location (xNbB$_0$, yNbB$_0$), and the partition index partIdx as inputs, and the output is assigned to the prediction block availability flag availableB$_0$.

When xPb>>Log 2XParMrgLevel is equal to xNbB$_0$>>Log 2XParMrgLevel and yPb>>Log 2YParMrgLevel is equal to yNbB$_0$>>Log 2YParMrgLevel, availableB$_0$ is set equal to FALSE.

The variables availableFlagB$_0$, refIdxLXB$_0$, predFlagLXB$_0$, and mvLXB$_0$ are derived as follows:

For the derivation of availableFlagA$_0$, refIdxLXA$_0$, predFlagLXA$_0$, and mvLXA$_0$ the following applies:

The luma location (xNbA$_0$, yNbA$_0$) inside the neighbouring luma coding block is set equal to (xPb−1, yPb+nPbH).

The availability derivation process for a prediction block as specified in clause 6.4.2 is invoked with the luma location (xCb, yCb), the current luma coding block size nCbS, the luma prediction block location (xPb, yPb), the luma prediction block width nPbW, the luma prediction block height nPbH, the luma location (xNbA$_0$, yNbA$_0$), and the partition index partIdx as inputs, and the output is assigned to the prediction block availability flag availableA$_0$.

When xPb>>Log 2XParMrgLevel is equal to xNbA$_0$>>Log 2XParMrgLevel and yPb>>Log 2YParMrgLevel is equal to yA$_0$>>Log 2YParMrgLevel, availableA$_0$ is set equal to FALSE.

The variables availableFlagA$_0$, refIdxLXA$_0$, predFlagLXA$_0$, and mvLXA$_0$ are derived as follows:

For the derivation of availableFlagB$_2$, refIdxLXB$_2$, predFlagLXB$_2$, and mvLXB$_2$ the following applies:

The luma location (xNbB$_2$, yNbB$_2$) inside the neighbouring luma coding block is set equal to (xPb−1, yPb−1).

The availability derivation process for a prediction block as specified in clause 6.4.2 is invoked with the luma location (xCb, yCb), the current luma coding block size nCbS, the luma prediction block location (xPb, yPb), the luma prediction block width nPbW, the luma prediction block height nPbH, the luma location (xNbB$_2$, yNbB$_2$), and the partition index partIdx as inputs, and the output is assigned to the prediction block availability flag availableB$_2$.

When xPb>>Log 2XParMrgLevel is equal to xNbB$_2$>>Log 2XParMrgLevel and yPb>>Log 2YParMrgLevel is equal to yNbB$_2$>>Log 2YParMrgLevel, availableB$_2$ is set equal to FALSE.

The variables availableFlagB$_2$, refIdxLXB$_2$, predFlagLXB$_2$, and mvLXB$_2$ are derived as follows: . . .

FIG. 27 is a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods described in the present document. The memory (memories) 2704 may be used for storing data and code used for implementing the methods and techniques described herein. The video processing hardware 2706 may be used to implement, in hardware circuitry, some techniques described in the present document.

Figure 28:
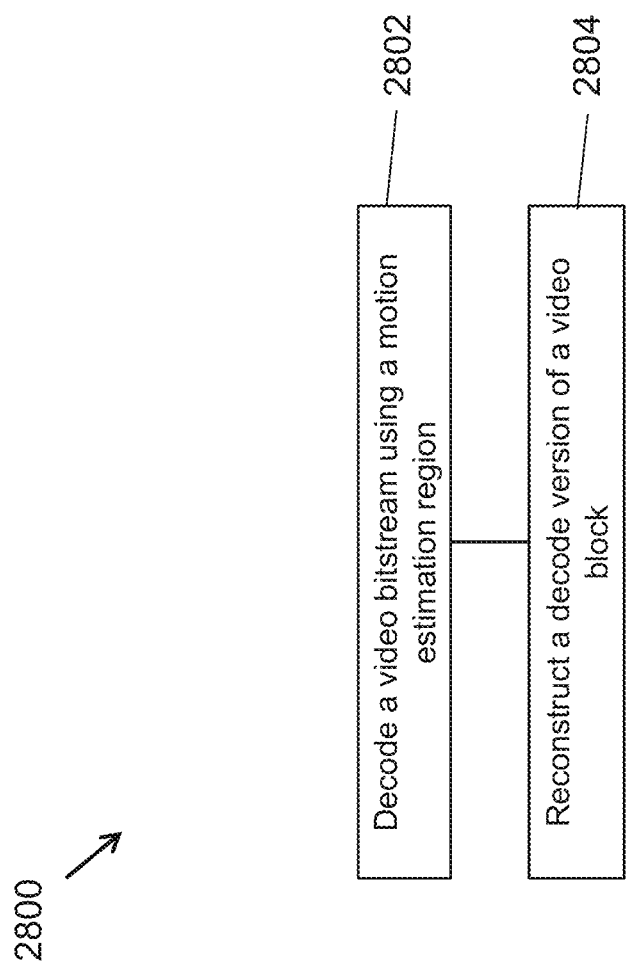
FIG. 28 is a flowchart for an example method of video bitstream processing.

FIG. 28 is a flowchart for a video decoding method 2800. The method 2800 includes decoding (2802) a video bitstream in which at least one video block is represented using a motion estimation region that is dependent on a coding characteristic of the video block, and reconstructing (2804), from the parsing, a decoded version of the video block, wherein the motion estimation region represents a portion of a video frame that includes the video block such that a motion vector merge candidate lists can be independently derived by checking whether a candidate block is located in that merge estimation region.

In some embodiments, the coding characteristics of the video block may include its partition type (e.g., CU or PU) or may include its shape (e.g., square, tall rectangular or broad rectangular). In some embodiments, the coding characteristic of the video block comprises a bit field in the video bitstream, wherein the bit field is in a sequence parameter set or a picture parameter set or a slice header of the video bitstream. In case that the video block is rectangular, the bitstream may include two separate fields for horizontal and vertical dimensions of the rectangular video block.

In some embodiments, the video bitstream may include at least one block indicated by a parent node that is split into M sub-blocks indicated by child notes wherein mode information of each sub-block is coded separately and the M sub-blocks are not further split, and M is an integer greater than 1, and wherein not all of the M sub-blocks share same motion information. Other example embodiments are described in the present document, e.g., in the Examples section 3.

Figure 29:
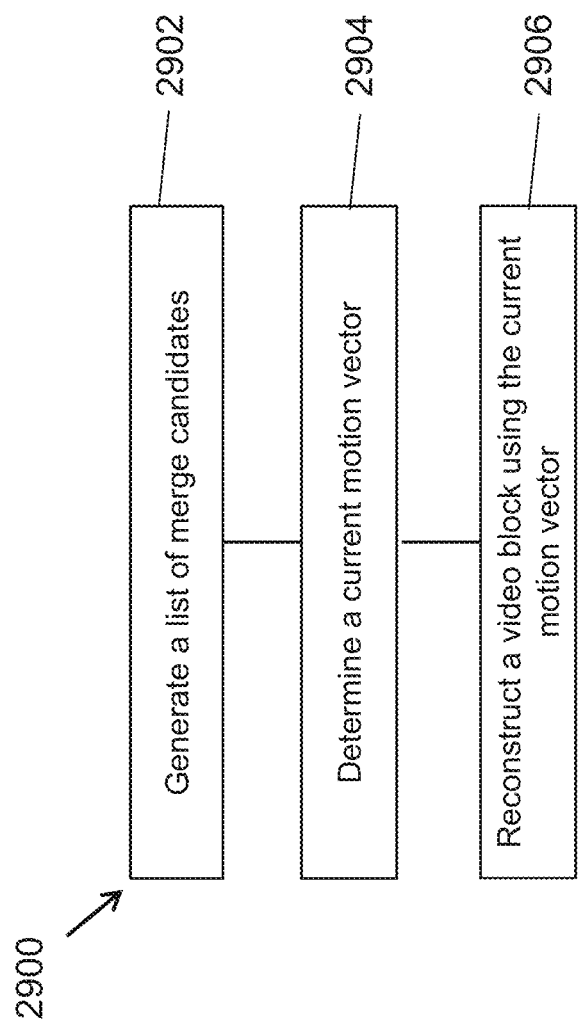
FIG. 29 is a flowchart for another example method of video bitstream processing.

FIG. 29 is a flowchart for an example video decoding method 2900. The method 2900 includes generating (2902), for a motion compensated video block in a video bitstream, a list of merge candidates, according to a first rule, determining (2904), using a second rule, a current motion information from the list of merge candidates, and reconstructing (2906) the video block based on the current motion information.

In some embodiments, the list of merge candidates includes at least one virtual merge candidate, and wherein the method further includes deriving the at least one virtual merge candidate by scaling motion vectors of another merge candidate to a different reference picture. In some embodiments, the list of merge candidates includes multiple virtual merge candidates and the method may then include deriving the multiple virtual merge candidates by scaling motion vectors of other merge candidates to different reference pictures. Virtual merge candidates may include, for example, merge candidates that are not directly based on candidates and motion vectors of spatially or temporally neighboring blocks, but are derived therefrom.

As previously described in Section 3, the derivation of the multiple merge candidates may be a function on the list of the merge candidates. In some embodiments, scaling of motion vectors may be performed by determining scaling amount based on reference picture index. Alternatively, or in addition, quality of picture such as quantization level with which the reference picture was coded, may be used to decided amount of scaling to be used. For example, reference pictures with lower quality (e.g., higher quantization) may be de-emphasized by scaling. In some embodiments, the virtual merge candidates may be added to the list in an order before the temporal motion vector predication candidates. Alternatively, the virtual merge candidates may be added after temporal merge candidates, but before bi-predictive merge candidates.

Figure 30:
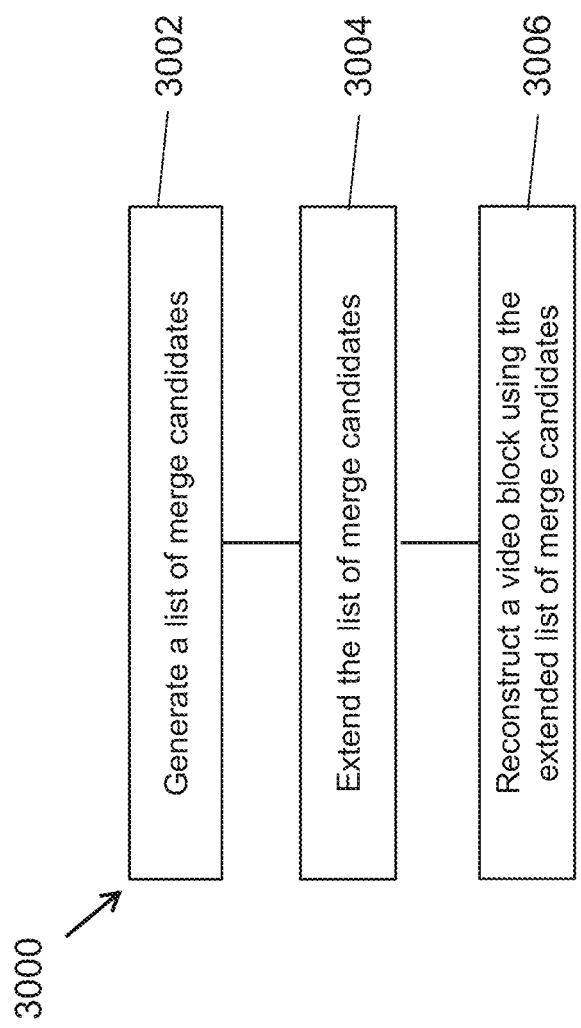
FIG. 30 is a flowchart for another example method of video bitstream processing.

FIG. 30 is a flowchart for a video decoding method 3000. The method 3000 includes generating (3002), for a video block in a video bitstream, a list of merge candidates, according to a first rule, extending (3004), using a second rule, the list of merge candidates to an extended list of merge candidates that includes additional merge candidates, and reconstructing (3006) the video block using the extended list of merge candidates.

In some embodiments, the extended list of merge candidates includes sub-block motion candidates obtained from a block identified by a motion vector of a spatial merge candidate and relative positions between the video block and the block. In some embodiments, the extended list of merge candidates includes a sub-block merge candidate for an intra block copy-coded merge or an affine merge within a current video frame that includes the video block.

In some embodiments, the method 3000 may further include deriving multiple temporal motion vector prediction candidates for the extended list of merge candidates using multiple blocks from one or more pictures. The multiple temporal motion vector prediction candidates include at least one candidate that uses a block with a same relative position to a top-left of a co-located picture as the video block. Various examples are show, for example, in FIGS. 26A to 26E.

In some embodiments, the method 3000 may further include applying a full pruning process to the additional merge candidates, wherein the full pruning process includes checking a new additional merge candidate with all other candidates in the list of merge candidates. In some embodiments, the method 3000 may further include applying a partial pruning process to the additional merge candidates, wherein the partial pruning process includes checking a new additional merge candidate with less than all candidates in the list of merge candidates.

Additional features and variations of the methods 2800, 2900 and 3000 are further described in Section 3 of the present document.

In some embodiments, a method of decoding a video bitstream includes parsing the video bitstream, and reconstructing video pictures from the parsing. The video bitstream includes at least one block indicated by a parent node that is split into M sub-blocks indicated by child nodes wherein mode information of each sub-block is coded separately and the M sub-blocks are not further split, and M is an integer greater than 1, and wherein not all of the M sub-blocks share same motion information. The use of such a video coding technique for block based video coding is further described throughout the present document.

In some embodiments, the above-described methods may be implemented by a video decoder apparatus, e.g., the apparatus 2700.

In some embodiments, a video encoder may implement the above-described during video reconstruction or motion compensation loop of video encoding process.

In some embodiments, the above-described methods may be embodied into processor-executable code and stored on a computer-readable program medium such as one or more memories or an optical storage device or a solid-state drive, and so on.

Figure 31:
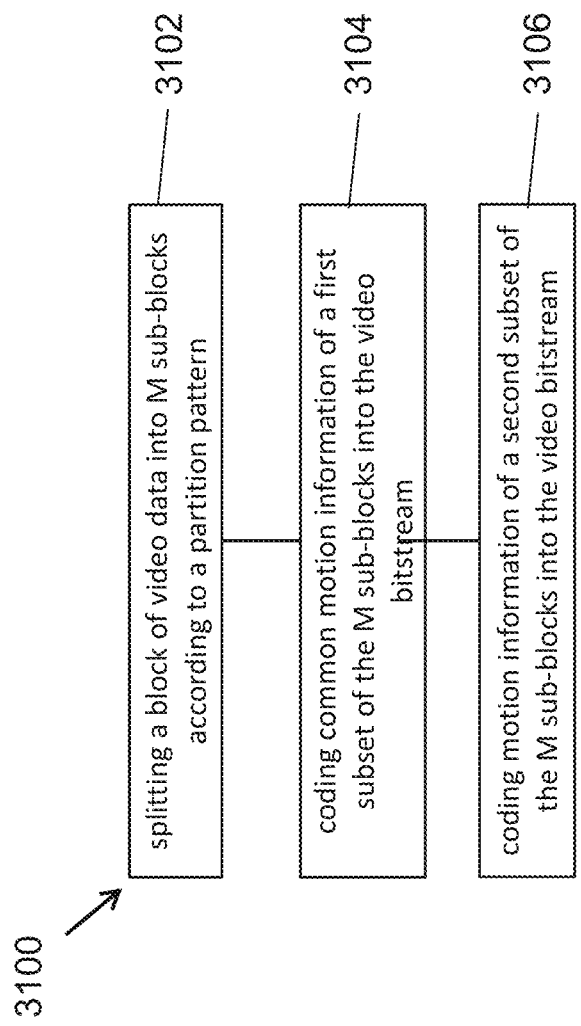
FIG. 31 is a flowchart representation for a video encoding method in accordance with the disclosed technology.

FIG. 31 is a flowchart representation for a video encoding method 3100 in accordance with the disclosed technology. The method 3100 includes, at operation 3102, splitting a block of video data into M sub-blocks according to a partition structure. M is an integer greater than 1 (M>1). The method 3100 includes, at operation 3104, coding a first subset of the M sub-blocks according to common motion information. The method 3100 also includes, at operation 3106, coding a second subset of the M sub-blocks according to motion information that is different than the common motion information for the first subset.

In some embodiments, the partition structure includes a quadtree partitioning structure in which each parent block includes four child sub-blocks. In some embodiments, the partition structure includes a binary tree partitioning structure in which each parent block includes two symmetric child sub-blocks. In some embodiments, the partition structure includes an asymmetric binary tree partitioning structure in which each parent block includes two asymmetric child sub-blocks. In some embodiments, the partition structure includes a ternary tree partitioning structure in which each parent block includes three child sub-blocks. In some embodiments, a sub-block of the M sub-blocks is a leaf node that is not further split, and wherein the sub-block is considered as a coding block.

In some embodiments, the first subset of the M sub-blocks includes first M-1 sub-blocks in the block of video data. In some embodiments, the second subset of the M sub-blocks includes a last sub-block in the block of video data.

In some embodiments, the second subset of the M sub-blocks is coded with a merge mode. The method 3100 further includes refraining from signaling a merge index of the merge mode in the bitstream upon determining that the merge index corresponds to motion information of a neighboring block of the block of video data. The neighboring block is covered by one or more sub-blocks in the first subset of the M sub-blocks.

In some embodiments, the second subset of the M sub-blocks is coded with a merge mode. The method 3100 further includes removing a merge candidate that provides the common motion information for the first subset of the M sub-blocks from a merge candidate list of the merge mode.

In some embodiments, the second subset of the M sub-blocks is coded with an advanced motion vector prediction (AMVP) mode. The method 3100 further includes refraining from signaling an AMVP motion vector predictor candidate index in the video bitstream upon determining that the AMVP motion vector predictor candidate index corresponds to motion information of a neighboring block of the block of video data. The neighboring block is covered by one or more sub-blocks in the first subset of the M sub-blocks.

In some embodiments, the second subset of the M sub-blocks is coded with a decoder-side motion vector mode or a frame rate up conversion mode. The method 3100 further includes skipping cost calculation for motion information that is identical to the common motion information for the first subset of the M sub-blocks. In some embodiments, the method 3100 also includes determining a cost value associated with the cost calculation to be a maximum value.

Figure 32:
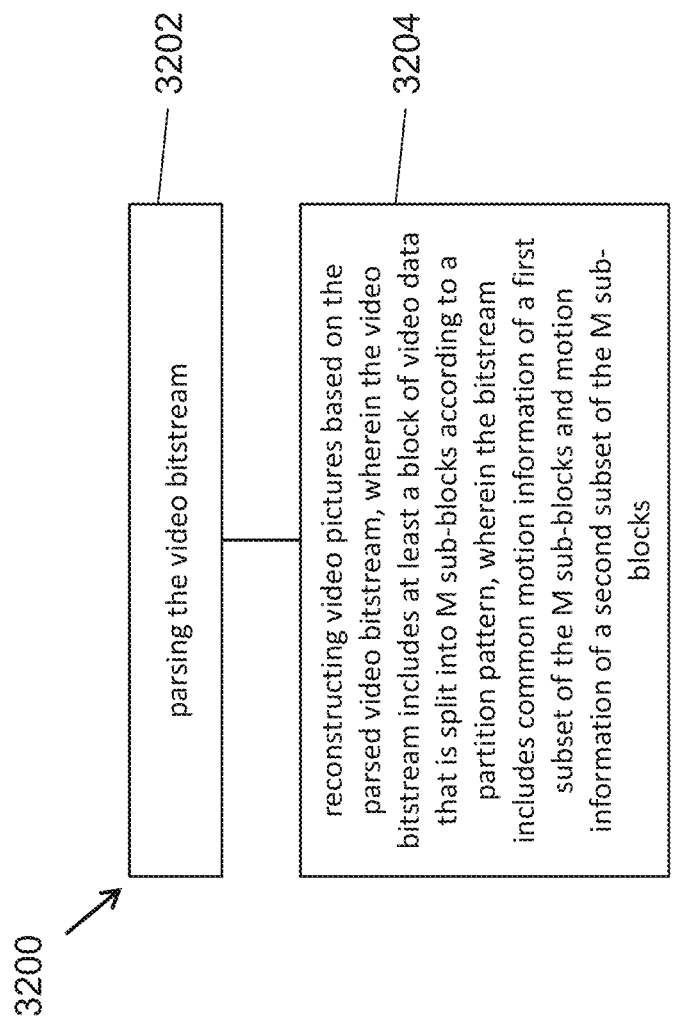
FIG. 32 is a flowchart representation for a video decoding method in accordance with the disclosed technology.

FIG. 32 is a flowchart representation of a video decoding method 3200 in accordance with the disclosed technology. The method 3200 includes, at operation 3202, parsing the video bitstream. The method 3200 also includes, at operation 3204, reconstructing video pictures based on the parsed video bitstream. The video bitstream includes at least a block of video data that is split into M sub-blocks according to a partition structure. M is an integer greater than 1 (M>1). A first subset of the M sub-blocks is coded according to common motion information and a second subset of the M sub-blocks is coded according to motion information different than the common motion information.

In some embodiments, the partition structure includes a quadtree partitioning structure in which each parent block includes four child sub-blocks. In some embodiments, the partition structure includes a binary tree partitioning structure in which each parent block includes two symmetric child sub-blocks. In some embodiments, the partition structure includes an asymmetric binary tree partitioning structure in which each parent block includes two asymmetric child sub-blocks. In some embodiments, the partition structure includes a ternary tree partitioning structure in which each parent block includes three child sub-blocks. In some embodiments, a sub-block of the M sub-blocks is a leaf node that is not further split, and wherein the sub-block is considered as a coding block.

In some embodiments, the first subset of the M sub-blocks includes first M-1 sub-blocks in the block of video data. In some embodiments, the second subset of the M sub-blocks includes a last sub-block in the block of video data.

In some embodiments, the second subset of the M sub-blocks is coded with a merge mode. A merge index corresponding to motion information of a neighboring block of the block of video data is skipped and the neighboring block is covered by one or more sub-blocks in the first subset of the M sub-blocks.

In some embodiments, the second subset of the M sub-blocks is coded with a merge mode. A merge candidate providing the common motion information for the first subset of the M sub-blocks is removed from a merge candidate list of the merge mode.

In some embodiments, the second subset of the M sub-blocks is coded with an advanced motion vector prediction (AMVP) mode. An AMVP motion vector predictor candidate index corresponding to motion information of a neighboring block of the block of video data is skipped and the neighboring block is covered by one or more sub-blocks in the first subset of the M sub-blocks.

In some embodiments, the second subset of the M sub-blocks is coded with a decoder-side motion vector mode or a frame rate up conversion mode. A cost value associated with motion information that is identical to the common motion information for the first subset of the M sub-blocks is determined to be a maximum value.

Figure 33:
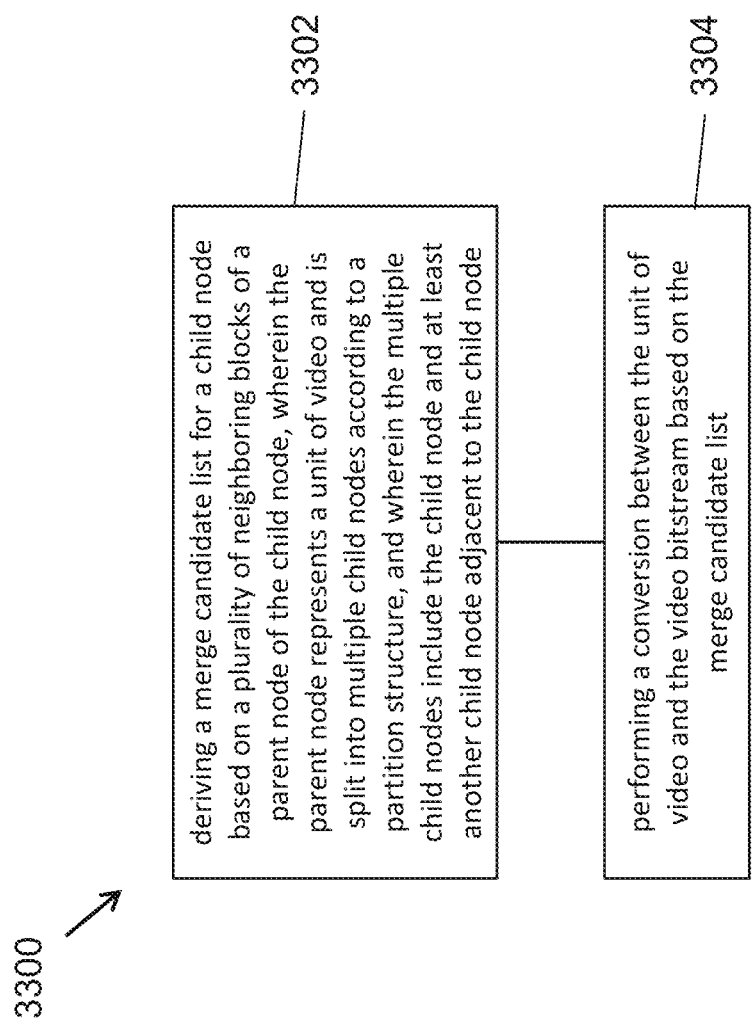
FIG. 33 is a flowchart representation of a video processing method in accordance with the disclosed technology.

FIG. 33 is a flowchart representation of a video encoding or decoding method 3300 in accordance with the disclosed technology. The method 3300 includes, at operation 3302, deriving a merge candidate list for a child node based on a plurality of neighboring blocks of a parent node of the child node. The parent node represents a unit of video data and is split into multiple child nodes according to a partition structure. The multiple child nodes include the child node and at least another child node adjacent to the child node. The method 3300 also includes, at operation 3304, performing a conversion between the unit of video data and the video bitstream.

In some embodiments, the partition structure includes binary tree partitioning structure in which each parent node includes two symmetric child nodes. In some embodiments, the partition structure includes an asymmetric binary tree partitioning structure in which each parent node includes two asymmetric child nodes. In some embodiments, the partition structure includes a ternary tree partitioning structure in which each parent node includes three child nodes. In some embodiments, the partition structure includes a quadtree partitioning structure in which each parent node includes four child nodes. In some embodiments, each child node is a leaf node that is considered as a coding unit.

In some embodiments, the plurality of neighboring blocks is determined by selecting a set of allowed blocks by excluding any blocks within the parent node. In some embodiments, the plurality of neighboring blocks includes one or more replacement blocks to replace the excluded blocks. In some embodiments, the deriving the merge candidate list includes combining the one or more replacement blocks with the set of allowed blocks to obtain the plurality of neighboring blocks.

Figure 34:
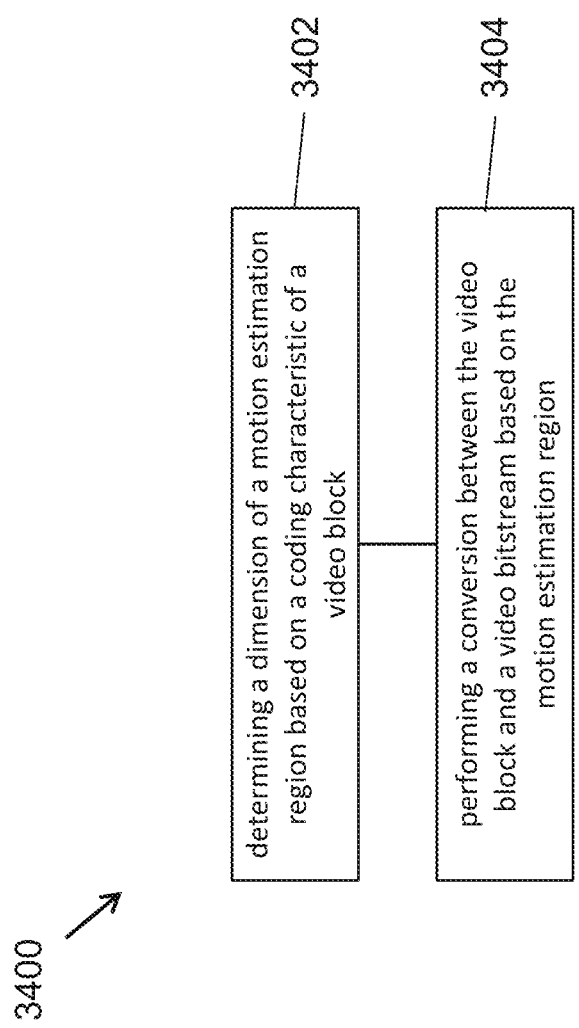
FIG. 34 is a flowchart representation of another video processing method in accordance with the disclosed technology.

FIG. 34 is a flowchart representation of a video processing method 3400 in accordance with the disclosed technology. The method 3400 includes, at operation 3402, determining a dimension of a motion estimation region based on a coding characteristic of a video block. The method 3400 includes, at operation 3404, performing a conversion between the video block and a video bitstream based on the motion estimation region. The motion estimation region represents a portion of a video frame that includes the video block such that a motion vector candidate list is independently derived by checking whether a candidate block is located in the merge estimation region.

In some embodiments, the coding characteristic of the video block includes a partition type. The partition type can be a binary tree partitioning type in which each parent node includes two child nodes. The partition type can be a ternary tree partitioning type in which each parent node includes three child nodes. The partition type can also be a quadtree partitioning type in which each parent block includes four child sub-blocks.

In some embodiments, the coding characteristic of the video block includes a dimension of the video block. The coding characteristic of the video block may also include a shape of the video block or a temporal layer index indicating a temporal layer of a current picture associated with the video block. In some embodiments, the motion estimation region has a width of M and a height of N, M being different than N.

In some embodiments, the dimension of the motion estimation region is coded in the bitstream. The dimension of the motion estimation region can be coded in a sequence parameter set, a picture parameter set, or a slice header. In some implementations, the bitstream includes two syntax elements to indicate a width and a height of the motion estimation region. In some implementations, the bitstream includes two separate indications of a width and a height of the motion estimation region. In some implementations, the bitstream includes a flag indicating whether the two syntax elements or two separate indications share a same value.

Figure 35:
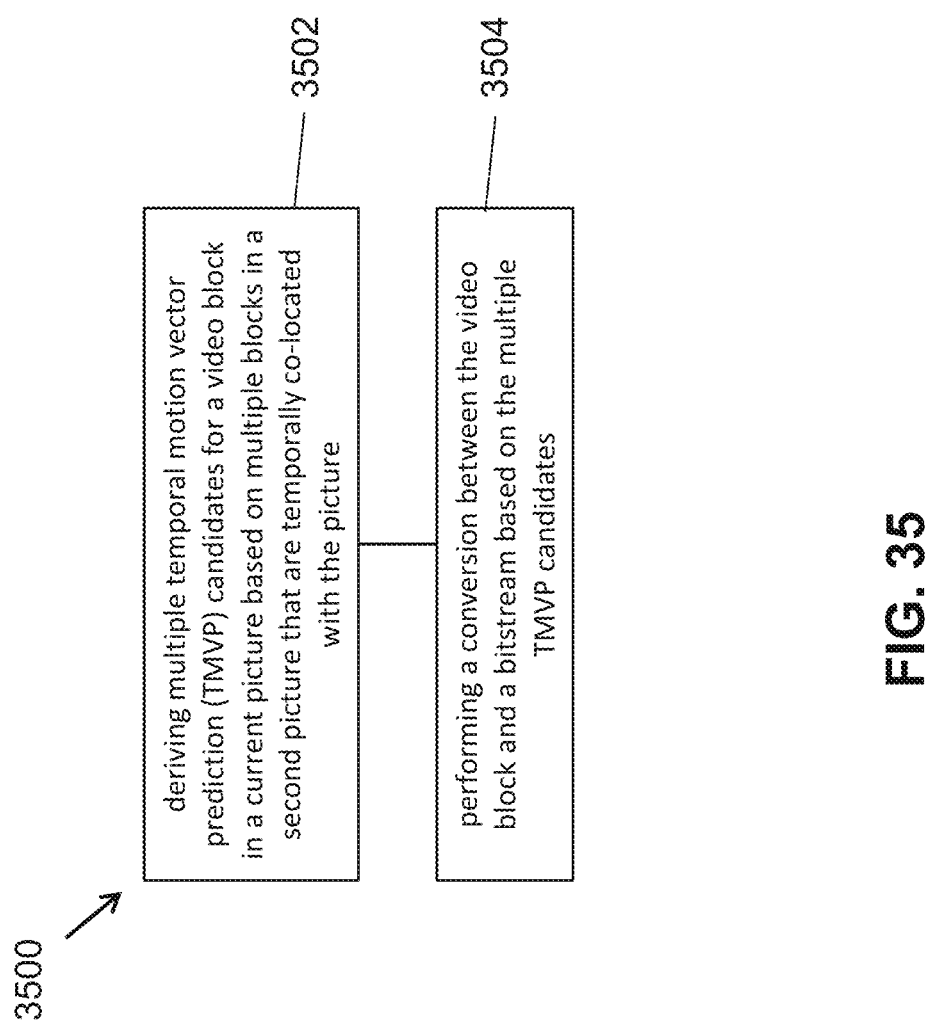
FIG. 35 is a flowchart representation of another video processing method in accordance with the disclosed technology.

FIG. 35 is a flowchart representation of a video processing method 3500 in accordance with the disclosed technology. The method 3500 includes, at operation 3502, deriving multiple temporal motion vector prediction (TMVP) candidates for a video block in a current picture based on multiple blocks in one or more pictures that are temporally co-located with the current picture. The current picture is excluded from the one or more pictures. The method 3500 includes, at operation 3502, adding the multiple TMVP candidates to a motion candidate list associated with the video block. The method 3500 also includes, at operation 3504, performing a conversion between the video block and a bitstream.

In some embodiments, the one or more pictures includes a single picture co-located with the current picture. In some embodiments, the multiple blocks are located inside a second block that is temporally collocated with the video block. The second block has a same size as the video block, and a relative position of the second block to a top-left corner of a second picture of the one or more pictures is same as that of the video block to a top-left corner of the current picture. In some embodiments, the multiple blocks are located inside a coding tree block covering a second block that is temporally collocated with the video block. In some embodiments, the multiple blocks are located outside a second block that is temporally collocated with the video block. In some embodiments, the multiple blocks are located outside a coding tree block covering a second block that is temporally collocated with the video block.

In some embodiments, the second block is identified by a non-zero motion vector. In some embodiments, the non-zero motion vector is derived from a spatial merge candidate of the second block. In some embodiments, the non-zero motion vector is derived by scaling a motion vector based on one of the one or more pictures.

In some embodiments, the method also includes adjusting one of the one or more pictures to be a reference picture associated with a spatial merge candidate. In some embodiments, the second block is identified by a motion vector derived from a merge candidate of the video block. In some embodiments, the second block is identified by a motion vector derived from motion information of a spatial neighboring block of the video block.

In some embodiments, the method further includes comparing a new TMVP candidate against all existing TMVP candidates, determining that the new TMVP candidate is identical to an existing TMVP candidate, and refraining from adding the new TMVP candidate to the multiple TMVP candidate. Alternatively, the method includes comparing a new TMVP candidate against a subset of existing TMVP candidates, determining that the new TMVP candidate is identical to an existing TMVP candidate, and refraining from adding the new TMVP candidate to the multiple TMVP candidate.

Figure 36:
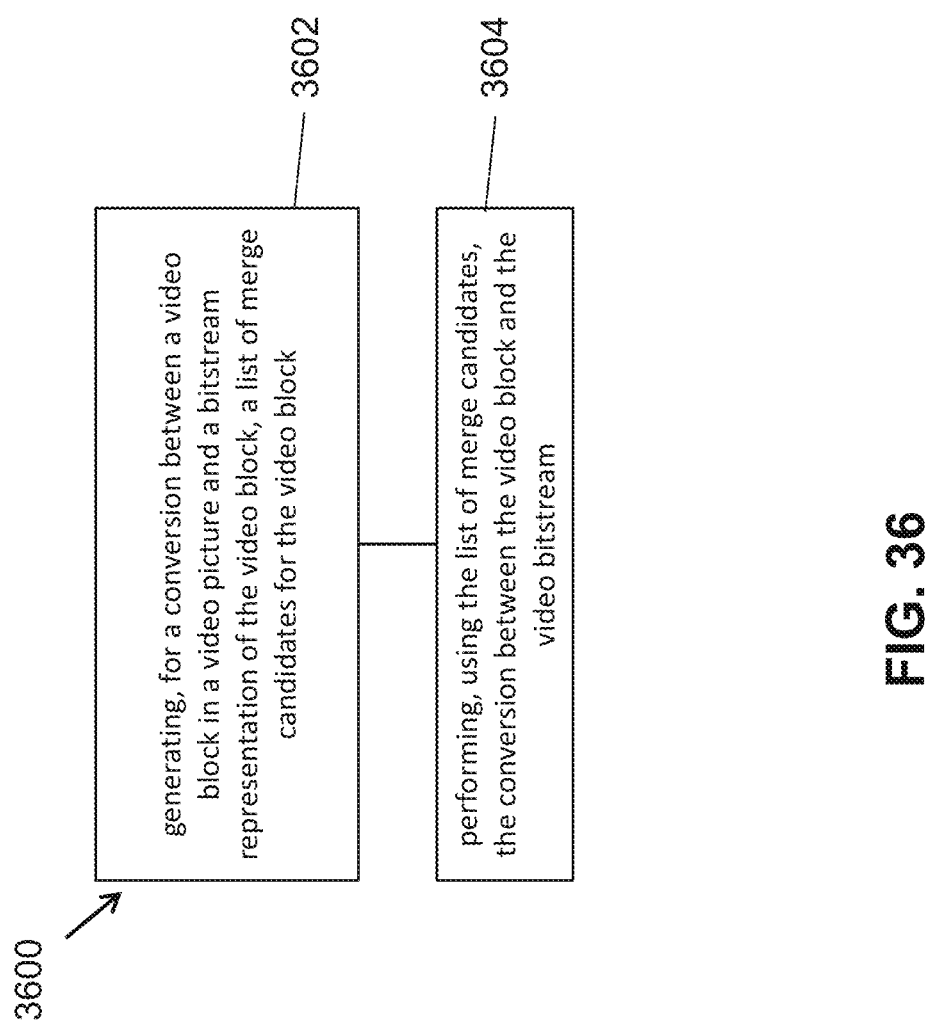
FIG. 36 is a flowchart representation of another video processing method in accordance with the disclosed technology.

FIG. 36 is a flowchart representation of a video processing method 3600 in accordance with the disclosed technology. The method 3600 includes, at operation 3602, generating, for a conversion between a video block in a video picture and a bitstream representation of the video block, a list of merge candidates for the video block. The list of merge candidates includes at least a first merge candidate that is a virtual merge candidate derived by modifying a motion vector and/or a reference picture of a second merge candidate. The method 3600 includes, at operation 3604, performing, using the list of merge candidates, the conversion between the video block and the video bitstream.

In some embodiments, the virtual merge candidate inherits a prediction direction from the second merge candidate.

In some embodiments, the second merge candidate is derived using a bi-prediction in which two reference picture lists are used, and wherein the virtual merge candidate is derived by modifying motion information associated only one of the two reference picture lists. In some embodiments, for a first reference picture list of the two reference picture lists, the virtual merge candidate inherits a first reference picture associated with the second merge candidate that is in the first reference picture list. In some embodiments, for a second reference picture list of the two reference picture lists, the virtual merge candidate is derived by scaling a motion vector with respect to a second reference picture that is in the second reference picture list. In some embodiments, the second merge candidate is derived using a uni-prediction in which only one reference picture list is used, and wherein the virtual merge candidate uses a bi-prediction in which two reference picture lists are used.

In some embodiments, the list of merge candidates includes multiple virtual merge candidates derived based on multiple corresponding merge candidates. In some embodiments, the method includes selecting, based on a first criterion, one or more merge candidates for deriving the virtual merge candidate. In some embodiments, the first criterion includes at least one of: an insertion order of the one or more merge candidates into the list; whether a merge candidate corresponds to bi-prediction; a type of a merge candidate, wherein the type indicates whether the merge candidate is a spatial merge candidate, a temporal merge candidate, a combined bi-prediction merge candidate, a zero motion vector merge candidate, or a sub-block merge candidate; a coded mode of a merge candidate, wherein the coded mode indicates whether the merge candidate is coded using affine motion, non-affine motion, illumination compensation, or non-illumination compensation; a size of the video block; a shape of the video block; or a coding mode of a neighboring block.

In some embodiments, the method includes selecting one or more spatial merge candidates for deriving the virtual merge candidate. In some embodiments, the method includes selecting one or more merge candidates coded using non-affine motion or non-illumination compensation for deriving the virtual merge candidate.

In some embodiments, the method includes selecting, based on a second criterion, one or more reference pictures for deriving the virtual merge candidate. In some embodiments, the second criterion includes at least one of an index of a reference picture; a picture order count different between a first reference picture and a second reference picture associated with the second merge candidate; a quantization parameter different between the first reference picture and the second reference picture associated with the second merge candidate; or a number of temporal layers of a reference picture.

In some embodiments, the virtual merge candidate is placed at a first position in the list of merge candidate list. In some embodiments, the first position includes one of: before temporal motion vector prediction (TMVP) candidates, after TMVP candidates and before combined bi-predictive merge candidates, or after combined bi-predictive merge candidates. In some embodiments, a bi-prediction based merge candidate has a higher priority than a uni-prediction based merge candidate.

In some embodiments, the virtual merge candidate is derived by modifying the motion vector of the second merge candidate based on multiple reference pictures, and the multiple reference pictures are ordered by a third criterion. In some embodiments, the third criterion includes at least one of: an increasing order of a reference picture index; a sequential order of checking pictures in different picture lists; an interleaved order of checking pictures in different picture lists; or a combination thereof.

In some embodiments, the virtual merge candidate includes more than two reference blocks. In some embodiments, the method includes comparing the sub-block motion candidate against at least a subset of existing candidates, determining that the sub-block motion candidate is identical to an existing candidate, and refraining from adding the sub-block motion candidate to a list of merge candidates.

Figure 37:
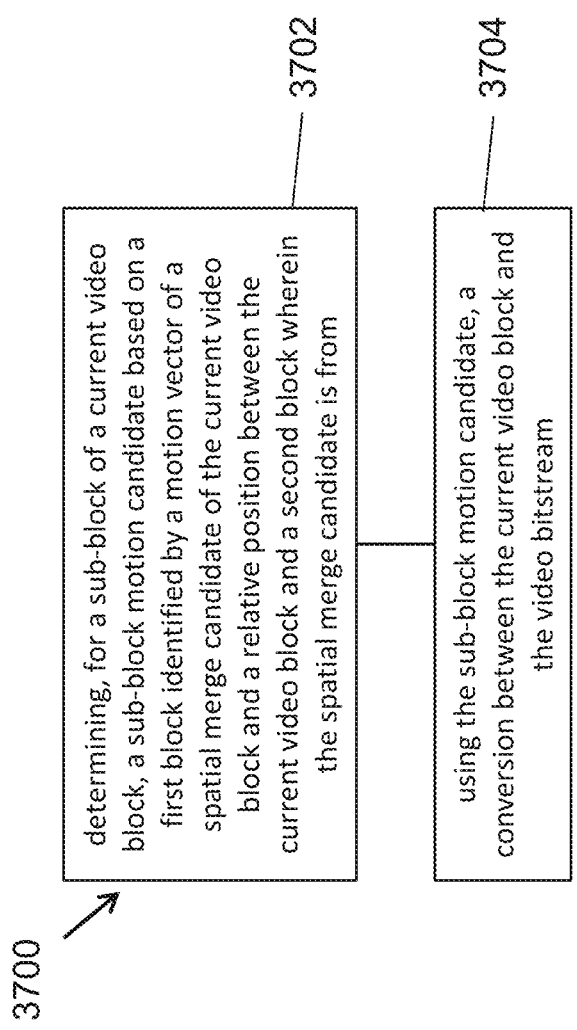
FIG. 37 is a flowchart representation of yet another video processing method in accordance with the disclosed technology.

FIG. 37 is a flowchart representation of a video processing method 3700 in accordance with the disclosed technology. The method 3700 includes, at operation 3702, determining, for a sub-block of a current video block, a sub-block motion candidate based on a first block identified by a motion vector of a spatial merge candidate of the current video block and a relative position between the current video block and a second block wherein the spatial merge candidate is from. The method 3700 includes, at operation 3704, performing, using the sub-block motion candidate, a conversion between the current video block and the video bitstream.

In some embodiments, the sub-block candidate is for alternative temporal motion vector prediction with the first block in a different picture from a current picture of the current video block. In some embodiments, the sub-block motion candidate is for intra block copy (IBC) merge mode coding with the first block being within a current frame of the current video block. In some embodiments, the sub-block candidate is for affine merge mode coding.

It will be appreciated that the present document discloses several additional ways by which merge candidates may be computed in video coding. Embodiments may benefit from these techniques in terms of improving quality of compressed representation of video due to the flexibility and ability to more accurately capture motion or changes in video pictures during encoding, and conveying the information in a bitstream by using a low number of bits.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A video processing method, comprising:
deriving multiple temporal motion vector prediction (TMVP) candidates for a video block in a current picture based on multiple blocks associated with a second block in one or more pictures that are temporally before or after the current picture, and the second block is collocated with the video block, wherein the second block has a same size as the video block, and wherein a relative position of the second block to a top-left corner of a second picture of the one or more pictures is same as that of the video block to a top-left corner of the current picture;
adding the multiple TMVP candidates to a motion candidate list associated with the video block; and
performing a conversion between the video block and a bitstream,
wherein the multiple blocks are located inside a coding tree block covering the second block, and
wherein the second block is identified by a non-zero motion vector that is derived from a spatial merge candidate of the second block,
the second block is identified by a motion vector derived from a merge candidate of the video block, or
the second block is identified by a motion vector derived from motion information of a spatial neighboring block of the video block.

2. The method of claim 1, wherein the one or more pictures includes a single picture co-located with the current picture.

3. The method of claim 1, wherein the multiple blocks are located inside the second block.

4. The method of claim 1, wherein the multiple blocks are located outside the second block.

5. The method of claim 1, wherein the non-zero motion vector is derived by scaling a motion vector based on one of the one or more pictures.

6. The method of claim 1, further comprising:
adjusting one of the one or more pictures to be a reference picture associated with a spatial merge candidate.

7. The method of claim 1, further comprising:
comparing a new TMVP candidate against all existing TMVP candidates;
determining that the new TMVP candidate is identical to an existing TMVP candidate; and
refraining from adding the new TMVP candidate to the multiple TMVP candidates.

8. The method of claim 1, further comprising:
comparing a new TMVP candidate against a subset of existing TMVP candidates;
determining that the new TMVP candidate is identical to an existing TMVP candidate; and
refraining from adding the new TMVP candidate to the multiple TMVP candidate.

9. A video encoding apparatus comprising a processor configured to implement a method of video processing, comprising:
deriving multiple temporal motion vector prediction (TMVP) candidates for a video block in a current picture based on multiple blocks associated with a second block in one or more pictures that are temporally before or after the current picture, and the second block is temporally collocated with the video block, wherein the second block has a same size as the video block, and wherein a relative position of the second block to a top-left corner of a second picture of the one or more pictures is same as that of the video block to a top-left corner of the current picture;
adding the multiple TMVP candidates to a motion candidate list associated with the video block; and
performing a conversion between the video block and a bitstream,
wherein the multiple blocks are located inside a coding tree block covering the second block, and
wherein the second block is identified by a non-zero motion vector that is derived from a spatial merge candidate of the second block,
the second block is identified by a motion vector derived from a merge candidate of the video block, or
the second block is identified by a motion vector derived from motion information of a spatial neighboring block of the video block.

10. The apparatus of claim 9, wherein the one or more pictures includes a single picture co-located with the current picture.

11. The apparatus of claim 9, wherein the multiple blocks are located inside the second block.

12. The apparatus of claim 9, wherein the multiple blocks are located outside the second block.

13. The apparatus of claim 9, wherein the non-zero motion vector is derived by scaling a motion vector based on one of the one or more pictures.

14. A video decoding apparatus comprising a processor configured to implement a method of video processing, comprising:
deriving multiple temporal motion vector prediction (TMVP) candidates for a video block in a current picture based on multiple blocks associated with a second block in one or more pictures that are temporally before or after the current picture, and the second block is collocated with the video block, wherein the second block has a same size as the video block, and wherein a relative position of the second block to a top-left corner of a second picture of the one or more pictures is same as that of the video block to a top-left corner of the current picture;
adding the multiple TMVP candidates to a motion candidate list associated with the video block; and
performing a conversion between the video block and a bitstream,
wherein the multiple blocks are located inside a coding tree block covering the second block, and
wherein the second block is identified by a non-zero motion vector that is derived from a spatial merge candidate of the second block,
the second block is identified by a motion vector derived from a merge candidate of the video block, or the second block is identified by a motion vector derived from motion information of a spatial neighboring block of the video block.

15. The apparatus of claim 14, wherein the one or more pictures includes a single picture co-located with the current picture.

16. The apparatus of claim 14, wherein the multiple blocks are located inside the second block.

17. The apparatus of claim 14, wherein the multiple blocks are located outside the second block.

18. A non-transitory computer-readable program medium having code stored thereupon, the code comprising instructions that, when executed by a processor, causing the processor to implement a method of video processing, comprising:

deriving multiple temporal motion vector prediction (TMVP) candidates for a video block in a current picture based on multiple blocks associated with a second block in one or more pictures that are temporally before or after the current picture, and the second block is collocated with the video block, wherein the second block has a same size as the video block, and wherein a relative position of the second block to a top-left corner of a second picture of the one or more pictures is same as that of the video block to a top-left corner of the current picture;

adding the multiple TMVP candidates to a motion candidate list associated with the video block; and performing a conversion between the video block and a bitstream, wherein the multiple blocks are located inside a coding tree block covering the second block, and wherein the second block is identified by a non-zero motion vector that is derived from a spatial merge candidate of the second block, the second block is identified by a motion vector derived from a merge candidate of the video block, or the second block is identified by a motion vector derived from motion information of a spatial neighboring block of the video block.

19. The non-transitory computer-readable program medium of claim 18, wherein the one or more pictures includes a single picture co-located with the current picture.

20. The non-transitory computer-readable program medium of claim 18, wherein the multiple blocks are located inside the second block.

\* \* \* \* \*